(12) United States Patent
Shaarawi et al.

(10) Patent No.: US 11,498,130 B2
(45) Date of Patent: Nov. 15, 2022

(54) THREE-DIMENSIONAL PRINTING

(71) Applicant: HEWLETT-PACKARD DEVELOPMENT COMPANY, L.P., Spring, TX (US)

(72) Inventors: Mohammed S Shaarawi, Corvallis, OR (US); James McKinnell, Corvallis, OR (US); Vladek Kasperchik, Corvallis, OR (US); David A Champion, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,131

(22) PCT Filed: Mar. 15, 2018

(86) PCT No.: PCT/US2018/022699
§ 371 (c)(1),
(2) Date: Oct. 14, 2019

(87) PCT Pub. No.: WO2019/168550
PCT Pub. Date: Sep. 6, 2019

(65) Prior Publication Data
US 2021/0001401 A1 Jan. 7, 2021

Related U.S. Application Data

(63) Continuation-in-part of application No. PCT/US2018/020169, filed on Feb. 28, 2018.

(51) Int. Cl.
*B22F 10/00* (2021.01)
*B22F 3/10* (2006.01)
(Continued)

(52) U.S. Cl.
CPC ............... *B22F 10/00* (2021.01); *B22F 1/05* (2022.01); *B22F 3/1021* (2013.01); *B22F 5/003* (2013.01);
(Continued)

(58) Field of Classification Search
None
See application file for complete search history.

(56) References Cited

U.S. PATENT DOCUMENTS

| 5,503,785 A | 4/1996 | Crump et al. |
| 6,609,043 B1 | 8/2003 | Zoia et al. |

(Continued)

FOREIGN PATENT DOCUMENTS

| CN | 101898423 A | 12/2010 |
| CN | 106414804 A | 2/2017 |

(Continued)

OTHER PUBLICATIONS

Chen Yong, Preparation and Characterization of Porous Materials,Jan. 31, 2010, p. 221, University of Science and Technology of China Press (+English Summary).

(Continued)

*Primary Examiner* — Colin W. Slifka
(74) *Attorney, Agent, or Firm* — Dierker & Kavanaugh PC

(57) ABSTRACT

In an example of a method for three-dimensional (3D) printing, build material layers are patterned to form an intermediate structure. During patterning, a binding agent is selectively applied to define a patterned intermediate part. Also during patterning, i) the binding agent and a separate agent including a gas precursor are, or ii) a combined agent including a binder and the gas precursor is, selectively applied to define a build material support structure adjacent to at least a portion of the patterned intermediate part. The (Continued)

intermediate structure is heated to a temperature that activates the gas precursor to create gas pockets in the build material support structure.

11 Claims, 7 Drawing Sheets

(51) Int. Cl.
| | |
|---|---|
| *B22F 5/00* | (2006.01) |
| *B33Y 30/00* | (2015.01) |
| *B33Y 50/02* | (2015.01) |
| *B29C 64/393* | (2017.01) |
| *B29C 64/165* | (2017.01) |
| *B33Y 70/10* | (2020.01) |
| *B22F 10/14* | (2021.01) |
| *B22F 10/85* | (2021.01) |
| *B22F 10/64* | (2021.01) |
| *B33Y 80/00* | (2015.01) |
| *B22F 10/68* | (2021.01) |
| *B22F 10/32* | (2021.01) |
| *B22F 10/47* | (2021.01) |
| *B33Y 40/00* | (2020.01) |
| *C09D 11/033* | (2014.01) |
| *C09D 11/38* | (2014.01) |
| *B22F 1/05* | (2022.01) |
| *B33Y 10/00* | (2015.01) |
| *B33Y 70/00* | (2020.01) |
| *B33Y 40/20* | (2020.01) |
| *B29K 505/00* | (2006.01) |

(52) U.S. Cl.
CPC .............. *B22F 10/14* (2021.01); *B22F 10/32* (2021.01); *B22F 10/47* (2021.01); *B22F 10/64* (2021.01); *B22F 10/68* (2021.01); *B22F 10/85* (2021.01); *B29C 64/165* (2017.08); *B29C 64/393* (2017.08); *B33Y 30/00* (2014.12); *B33Y 40/00* (2014.12); *B33Y 50/02* (2014.12); *B33Y 70/10* (2020.01); *B33Y 80/00* (2014.12); *C09D 11/033* (2013.01); *C09D 11/38* (2013.01); *B22F 2201/013* (2013.01); *B22F 2302/10* (2013.01); *B22F 2302/45* (2013.01); *B22F 2998/10* (2013.01); *B22F 2999/00* (2013.01); *B29K 2505/00* (2013.01); *B33Y 10/00* (2014.12); *B33Y 40/20* (2020.01); *B33Y 70/00* (2014.12)

(56) References Cited

U.S. PATENT DOCUMENTS

| | | |
|---|---|---|
| 9,144,940 B2 | 9/2015 | Martin |
| 9,168,328 B2 | 10/2015 | Sun et al. |
| 9,592,539 B2 | 3/2017 | Dunn et al. |
| 9,630,249 B2 | 4/2017 | Toyserkani et al. |
| 9,744,720 B2 | 8/2017 | Napadensky |
| 9,815,118 B1 | 11/2017 | Schmitt et al. |
| 2005/0074596 A1 | 4/2005 | Nielsen et al. |
| 2008/0090719 A1 | 4/2008 | Wada et al. |
| 2008/0241404 A1 | 10/2008 | Allaman et al. |
| 2015/0093283 A1 | 4/2015 | Miller et al. |
| 2015/0273582 A1 | 10/2015 | Crump et al. |
| 2015/0321289 A1 | 11/2015 | Bruck et al. |
| 2016/0023373 A1 | 1/2016 | Demuth et al. |
| 2016/0122541 A1 | 5/2016 | Jaker et al. |
| 2016/0168453 A1 | 6/2016 | Florio et al. |
| 2016/0207112 A1 | 7/2016 | Pallari |
| 2016/0214176 A1 | 7/2016 | Bruck et al. |
| 2016/0222791 A1 | 8/2016 | Rogers |
| 2016/0229128 A1 | 8/2016 | Dayagi et al. |
| 2016/0250808 A1 | 9/2016 | Barnwell et al. |
| 2017/0057014 A1 | 3/2017 | Illston et al. |
| 2017/0066197 A1 | 3/2017 | Morikawa et al. |
| 2017/0173877 A1 | 6/2017 | Myerberg et al. |
| 2017/0225227 A1 | 8/2017 | Volk |
| 2017/0232671 A1 | 8/2017 | Fieldman |
| 2017/0252819 A1 | 9/2017 | Gibson et al. |
| 2017/0253751 A1 | 9/2017 | Busbee et al. |
| 2017/0266882 A1 | 9/2017 | Yan et al. |
| 2017/0297099 A1 | 10/2017 | Gibson et al. |
| 2017/0297106 A1 | 10/2017 | Myerberg et al. |
| 2017/0297108 A1 | 10/2017 | Gibson et al. |
| 2017/0312824 A1 | 11/2017 | Harrysson |
| 2017/0361600 A1 | 12/2017 | Bandyopadhyay et al. |

FOREIGN PATENT DOCUMENTS

| | | |
|---|---|---|
| CN | 106515000 A | 3/2017 |
| CN | 106735224 A | 5/2017 |
| CN | 107116218 A | 9/2017 |
| EP | 3278908 A1 | 2/2018 |
| RU | 2015148439 A | 5/2017 |
| RU | 2629072 C2 | 8/2017 |
| WO | WO-2014092205 A1 | 6/2014 |
| WO | WO-2015175167 | 11/2015 |
| WO | WO-2016068899 A1 | 5/2016 |
| WO | 2017/014785 A1 | 1/2017 |
| WO | 2017/180314 A1 | 10/2017 |
| WO | 2017/181054 A1 | 10/2017 |
| WO | 2018/017130 A1 | 1/2018 |
| WO | WO-2018022034 A1 | 2/2018 |

OTHER PUBLICATIONS

Li Jingyuan, Special Metal Materials and Processing Technology Thereof, May 31, 2010, p. 225, Metallurgical Industry Press (+English Summary).
Halinen, Juho, 3D Printing—Increasing Competitiveness in Technical Maintenance, Apr. 1, 2017, Aaltodoc, 71 pages.
Supports in 3d Printing: a Technology Overview, 2016, online available at <https://www.3dhubs.com/knowledge-base/supports-3d-printing-technology-overview>, 15 pages.

THREE-DIMENSIONAL PRINTING

CROSS-REFERENCE TO RELATED APPLICATIONS

This application claims priority to International Patent Application Number PCT/US2018/020169 filed Feb. 28, 2018, the contents of which is incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
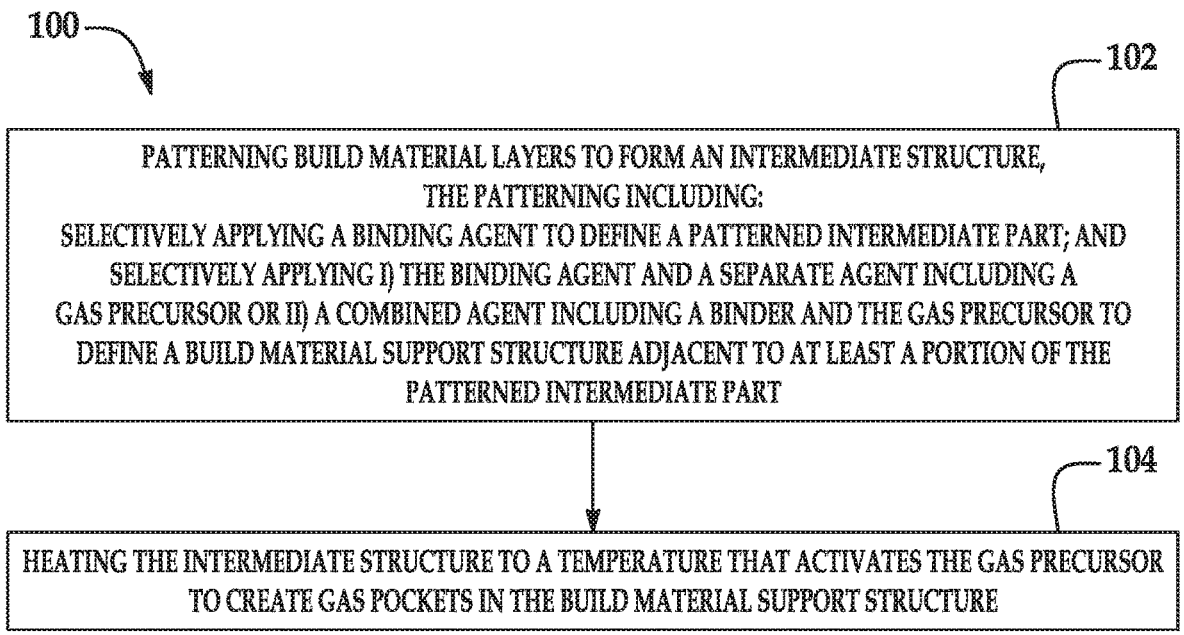
FIG. 1 is a flow diagram illustrating an example of a 3D printing method disclosed herein.

In some examples of three-dimensional (3D) printing, a liquid functional agent is selectively applied to a layer of build material on a build platform to pattern a selected region of the layer, and then another layer of the build material is applied thereon. The liquid functional agent may be applied to this other layer of build material, and these processes may be repeated to form a green part (also known as a green body, and referred to herein as a patterned intermediate part) of the 3D part that is ultimately to be formed. The liquid functional agent is capable of penetrating the layer of build material onto which it is applied, and spreading onto the exterior surface of the build material particles of that layer. The liquid functional agent may include a binder that holds the build material particles of the patterned intermediate part together. The patterned intermediate part may then be exposed to heat to sinter the build material in the patterned intermediate part to form the 3D object/part.

In some 3D printing methods, sections of a patterned intermediate part may not directly be supported by the build platform during the patterning process, and/or may not be supported by a heating mechanism platform during the sintering process. A lack of support can lead to deformation of those sections during patterning and/or sintering. The lack of support is undesirable because it may render the final finished part otherwise unusable, aesthetically unpleasing, etc. In the examples disclosed herein, a build material support structure is built as the patterned intermediate part is built, which provides support to the patterned intermediate part during patterning. Also in the examples disclosed herein, the build material support structure is temporarily bound to the patterned intermediate part and thus can be moved to a heating mechanism platform with the patterned intermediate part to provide support during sintering.

As mentioned herein, the build material support structure is temporarily bound to the patterned intermediate part. During sintering, gas pockets are formed throughout the build material support structure. These gas pockets provide the resulting 3D support structure with fragility, which allows the 3D support structure to be easily removed from the 3D object.

Definitions

Throughout this disclosure, it is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

As used herein, the terms "remaining region of the patterned intermediate part," "portion of the patterned intermediate part," or "layer of the patterned intermediate part" refers to a subsection of the intermediate part that does not have a shape representative of the final 3D printed part, and that includes build material particles patterned with a binding liquid functional agent (i.e., binding agent). In the remaining portion, the portion, or the layer of the patterned intermediate part, the build material particles may or may not be weakly bound together by one or more components of the binding liquid functional agent and/or by attractive force(s) between the build material particles and the binding agent. Moreover, it is to be understood that any build material that is not patterned with the binding agent is not considered to be part of the portion of the patterned intermediate part, even if it is adjacent to or surrounds the portion of the patterned intermediate part.

As used herein, the term "patterned intermediate part" refers to an intermediate part that has a shape representative of the final 3D printed part, and that includes build material particles patterned with the binding agent. In the patterned intermediate part, the build material particles may or may not be weakly bound together by one or more components of the binding agent and/or by attractive force(s) between the build material particles and the binding agent. In some instances, the mechanical strength of the patterned intermediate part is such that it cannot be handled or extracted from a build platform. Moreover, it is to be understood that any build material that is not patterned with the binding liquid functional agent is not considered to be part of the patterned intermediate part, even if it is adjacent to or surrounds the patterned intermediate part.

As used herein, the term "build material support structure" refers to at least one layer of build material that is patterned with the gas generating liquid functional agent. The build material support structure is positioned adjacent to at least a portion of the patterned intermediate part. The build material support structure provides support for i) additional layer(s) of build material that are patterned with the binding agent, and/or ii) patterned layers during sintering.

As used herein, the term "intermediate structure" includes the patterned intermediate part and the build material support structure temporarily bound together.

As used herein, the term "densified intermediate part" refers to a patterned intermediate part from which the liquid components of the binding agent have at least substantially evaporated. At least substantial evaporation of the liquid components of the binding agent leads to densification of the intermediate part, which may be due to capillary compaction. The at least substantial evaporation of the binding agent may also allow the binder to bind the build material particles of the densified intermediate part. In other words, the "densified intermediate part" is an intermediate part with a shape representative of the final 3D printed part and that includes the build material particles bound together by the binder. Compared to the patterned intermediate part, the mechanical strength of the densified intermediate part is greater, and the densified intermediate part can be handled or extracted from the build area platform.

The patterned or densified intermediate part may be known as a green part, but it is to be understood that the term "green" when referring to the patterned intermediate/green part or the densified intermediate/green part does not connote color, but rather indicates that the part is not yet fully processed.

As used herein, the term "at least substantially binder-free intermediate part" refers to an intermediate part that has been exposed to a heating process that initiates thermal decomposition of the binder so that the temporary binder is at least partially removed. In some instances, volatile organic components of, or produced by the thermally decomposed binder are completely removed and a very small amount of non-volatile residue from the thermally decomposed binders may remain. The small amount of the non-volatile residue is generally <2 wt % of the initial binder amount, and in some instances is <0.1 wt % of the initial binder amount. In other instances, the thermally decomposed binder (including any products and residues) is completely removed. In other words, the "at least substantially binder-free intermediate part" refers to an intermediate part with a shape representative of the final 3D printed part and that includes build material particles bound together as a result of i) weak sintering (i.e., low level necking between the particles, which is able to preserve the part shape), or ii) a small amount of the non-volatile binder residue remaining, and/or iii) a combination of i and ii.

The at least substantially binder-free intermediate part may have porosity similar to or greater than the densified intermediate part (due to temporary binder removal), but the porosity is at least substantially eliminated during the transition to the 3D printed part/object.

The at least substantially binder-free intermediate part may be known as a gray part, but it is to be understood that the term "gray" when referring to the at least substantially binder-free gray part does not connote color, but rather indicates that the part is not yet fully processed.

As used herein, the terms "3D printed part or object," "3D part," and "3D object" refer to a completed, sintered part.

As used herein, the "gas generating liquid functional agent" refers to a liquid functional agent that includes a compound that will decompose or react with an oxidizing agent during heating of the intermediate structure to generate gas pockets within a portion of the intermediate structure that is patterned with the gas generating liquid functional agent. "Gas pockets" are voids, spaces, or pores that are formed among build material and/or coalesced (e.g., sintered) build material as a reaction product of a reaction involving the compound during heating of the intermediate structure. In some examples, the gas generating liquid functional agent is a separate agent used in combination with the binding agent. In these examples, the gas generating liquid functional agent does not include a binder. In other examples, the gas generating liquid functional agent may also include the binder that can temporarily bind the build material of the build material support structure. In these examples, the gas generating liquid functional agent may be referred to as a combined agent, and a separate binding agent may not be used for patterning the build material support structure. Examples of the gas generating liquid functional agent are described further herein below.

Also as used herein, the "binding liquid functional agent" or "binding agent" refers to a patterning fluid that includes a binder, but that does not include the compound that will decompose or react to form the gas pockets upon heating. Examples of the binding agent are described further herein below.

It is to be understood that the weight percentages provided herein may vary, depending upon the weight percentage of the active components within a solution, dispersion, etc. used to form the binding agent, gas generating liquid functional agent, etc., and also on the desired weight percentage of the active components within the binding agent, gas generating liquid functional agent, etc. For example, if a dispersion (to be added to the binding agent) includes 10% of the active component, and the target weight percentage of the active component in the binding agent is 0.01%, then the amount of the dispersion that is added is 0.1% to account for the non-active components in the dispersion.

The examples disclosed herein provide several methods for forming the intermediate structure, and the final sintered object and the irreversibly breakable support structure. In some examples, both the gas generating liquid functional agent and the binding liquid functional agent are utilized in forming the build material support structure. In other examples, the build material support structure is formed using the combined agent. In the examples disclosed herein, the same types of build material, gas generating liquid functional agents, and/or binding liquid functional agents may be used. Each of the components will now be described.

Build Material

In examples of the method disclosed herein, the same build material may be used for generating the 3D part and the irreversibly breakable support structure. The build material can include metal build material.

In an example, the build material particles are a single phase metallic material composed of one element. In this example, the sintering temperature may be below the melting point of the single element.

In another example, the build material particles are composed of two or more elements, which may be in the form of a single phase metallic alloy or a multiple phase metallic alloy. In these other examples, sintering generally occurs over a range of temperatures.

The build material particles may be composed of a single element or alloys. Some examples of the metallic build material particles include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2×××series aluminum, 4×××series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, SS 430L, Ti6Al4V, and Ti-6Al-4V EL17. While several example alloys have been provided, it is to be understood that other alloys may be used.

The temperature(s) at which the metallic particles sinter is/are above the temperature of the environment in which the patterning portion of the 3D printing method is performed (e.g., above 100° C.). In some examples, the metallic build material particles may have a melting point ranging from about 500° C. to about 3500° C. In other examples, the metallic build material particles may be an alloy having a range of melting points.

The build material particles may be similarly sized particles or differently sized particles. The individual particle size of each of the build material particles is up to 100 μm. In an example, the build material particles may be particles, having a particle size ranging from about 1 μm to less than 100 μm. In another example, the individual particle size of the build material particles ranges from about 1 μm to about 30 μm. In still another example, the individual particle size of the build material particles ranges from about 2 μm to about 50 μm. In yet another example, the individual particle size of the build material particles ranges from about 5 μm to about 15 μm. In yet another example, the individual particle size of the build material particles ranges from about 3.25 μm to about 5 μm. In yet another example, the individual particle size of the build material particles is about 10 μm. As used herein, the term "individual particle size" refers to the particle size of each individual build material particle. As such, when the build material particles have an individual particle size ranging from about 1 μm to about 100 μm, the particle size of each individual build material particle is within the disclosed range, although individual build material particles may have particle sizes that are different than the particle size of other individual build material particles. In other words, the particle size distribution may be within the given range. The particle size of the build material particles generally refers to the diameter or volume weighted mean/average diameter of the build material particle, which may vary, depending upon the morphology of the particle. The build material particles may also be non-spherical, spherical, random shapes, or combinations thereof.

Gas Generating Liquid Functional Agent

The gas generating liquid functional agent may be used to pattern build material where it is desirable to form the irreversibly breakable 3D support structure. Some examples of the gas generating liquid functional agent are used with a separate binding agent; and other examples of the gas generating liquid functional agent are a combined agent that includes the binder, and thus are not used with a separate binding agent.

Whether a separate agent or a combined agent, in some examples, the gas generating liquid functional agents disclosed herein are aqueous (i.e., water) based liquids including a gas precursor compound(s). In other examples, the gas generating liquid functional agents disclosed herein are solvent based liquids including the gas precursor compound(s).

The gas precursor includes a compound that is to be activated, at a temperature within the sintering temperature range (of a build material), to generate gas pockets within the build material that is patterned with the gas generating liquid functional agent. The gas precursor compound(s) is selected such that it undergoes reaction(s) to initiate gas formation at the high temperatures used in the sintering stage(s) of the printing process. In the examples disclosed herein, the build material support structure is patterned with the gas generating liquid functional agent, and as a result of the gas generation, a mechanically weak, irreversibly breakable 3D support structure is formed. The high activation temperature property of the gas precursor limits the type of gas precursor compounds that are capable of producing the mechanically weak sintered support structure. In the examples disclosed herein, the gas precursor compound(s) may undergo thermal decomposition or oxidation when exposed to temperature(s) within a sintering temperature range of the printing process.

In an example, the gas precursor is selected from the group consisting of a transition metal hydride, an alkaline earth carbonate that releases carbon dioxide when activated, and a solid state mixture of an oxidizable species and an oxidizing agent to produce an oxidation product in a gas state at a sintering temperature used during the heating.

Some examples of the gas precursor compound(s) include inorganic materials that produce gas through thermal decomposition. Suitable inorganic materials include the transition metal hydrides (for example, titanium hydride, $TiH_{(2-x)}$) and the alkaline earth carbonates (for example, calcium carbonate, barium carbonate, strontium carbonate).

At temperatures between about 300° C. to about 500° C., titanium hydride decomposes slowly, releasing hydrogen. Given its non-stoichiometric nature, however, its rate of decomposition increases with further increase in temperature until the melting temperature of metallic titanium is reached. Thus, titanium hydride can be used as a gas precursor compound when it is desirable to form gas pockets at a temperature range of from about 400° C. to about 900° C. Titanium hydride may be a suitable gas precursor compound with an aluminum build material. Titanium hydride is hydrolytically stable, and thus can be readily incorporated into the aqueous based agents disclosed herein.

Alkaline earth carbonates decompose releasing carbon dioxide ($CO_2$) at elevated temperatures. In other words, the gas precursor is an alkaline earth carbonate that releases $CO_2$ when activated. Examples of the alkaline earth carbonates that may be suitable gas precursor compound(s) include calcium carbonate (which thermally decomposes at about 840° C.), barium carbonate (which thermally decomposes at about 1,360° C.), strontium carbonate (which thermally decomposes at temperatures ranging from about 1,100° C. up to about 1,500° C. In an example, the alkaline earth carbonate has a particle size less than 100 nm. A greater $CO_2$ concentration in the atmosphere during thermal decomposition can increase the carbonate decomposition temperature. As such, it may be desirable for alkaline earth carbonate decomposition to take place in an inert, reducing, or vacuum environment.

Some other examples of the gas precursor compound(s) include materials that produce gas through oxidation. Examples of these materials include solid state mixtures of oxidizable species with oxidizing agents. Components for the solid state mixtures are chosen such that i) the gas forming redox reactions in the mixtures are activated at the sintering temperatures of the metal part, and ii) the reducing and oxidizing components in the mixtures are present in stoichiometric ratio, thereby enabling a maximum yield of gas produced by the redox reaction. In examples of the solid state mixtures, the oxidizable species includes carbon particles and the oxidizing agent is a transition metal oxide selected from the group consisting of $Fe_2O_3$ (iron (III) oxide), $Mn_2O_3$ (manganese (III) oxide), $Cr_2O_3$ (chromium (III) oxide), $Co_3O_4$ (cobalt (II, III) oxide), etc. The gas produced from such oxides may include the carbon oxide gases, carbon dioxide ($CO_2$) and carbon monoxide (CO). The gas production from such oxides may proceed according to the scheme illustrated in equations I to IV below:

$$2Me_2O_3 + 3C \rightarrow 4Me + 3CO_2 \quad (I)$$

$$2Me_2O_3 + 3C \rightarrow 4Me + 6CO \quad (II)$$

$$Me_3O_4 + 2C \rightarrow 3Me + 2CO_2 \quad (III)$$

$$Me_3O_4 + 4C \rightarrow 3Me + 4CO \quad (IV)$$

where Me represents metal. When ferrous oxides are used in the reactions above, the reactions proceed with rates and yield at temperatures typically higher than about 900° C. to about 1000° C., which overlaps with the temperature range used for the sintering of ferrous alloy powders.

The gas precursor compound may be present in the gas generating liquid functional agent in an amount ranging from about 1 wt % to about 75 wt % of the total weight of the gas generating liquid functional agent. In another example, the gas precursor compound may be present in the gas generating liquid functional agent in an amount ranging from about 2 wt % to about 40 wt % or about 50 wt % of the total weight of the gas generating liquid functional agent. These percentages may include both active gas precursor compound and other non-active components present with the compound. It is to be understood that the upper limit may be increased as long as the gas generating liquid functional agent can be jetted via a desired inkjet printhead.

When the gas generating liquid functional agent is used with a separate binding agent, the gas generating liquid functional agent may include the previously described compound (i.e., gas precursor compound), any of a surfactant or a dispersing aid, a co-solvent, and a balance of water. The separate gas generating liquid functional agent may also include antimicrobial agent(s) and/or anti-kogation agent(s), but does not include a binder.

The co-solvent may be an organic co-solvent present in the gas generating liquid functional agent in an amount ranging from about 0.5 wt % to about 50 wt % (based on the total weight of the gas generating liquid functional agent). It is to be understood that other amounts outside of this range may also be used depending, at least in part, on the jetting architecture used to dispense the gas generating liquid functional agent. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones/pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the gas generating liquid functional agent may include 2-pyrrolidone, 1,2-butanediol, 2-methyl-1,3-propanediol, 1-(2-hydroxyethyl)-2-pyrrolidone, or combinations thereof.

The gas generating liquid functional agent may also include surfactant(s) and/or dispersing aid(s). Surfactant(s) and/or dispersing aid(s) may be used to improve the wetting properties and the jettability of the gas generating liquid functional agent. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or secondary alcohol ethoxylates (commercially available as TERGITOL® TMN-6, TERGITOL® 15-S-7, TERGITOL® 15-S-9, etc. from The Dow Chemical Co.). In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) in the gas generating liquid functional agent may range from about 0.1 wt % to about 6 wt % based on the total weight of the gas generating liquid functional agent.

The gas generating liquid functional agent may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the gas generating liquid functional agent may include a total amount of antimicrobial agents that ranges from about 0.01 wt % to about 1 wt %. In an example, the antimicrobial agent is a biocide and is present in the gas generating liquid functional agent in an amount of about 0.1 wt % (based on the total weight of the gas generating liquid functional agent). These percentages may include both active antimicrobial agent and other non-active components present with the antimicrobial agent.

An anti-kogation agent may also be included in the gas generating liquid functional agent. Kogation refers to the deposit of dried solids on a heating element of a thermal inkjet printhead. Anti-kogation agent(s) is/are included to assist in preventing the buildup of kogation, and thus may be included when the gas generating liquid functional agent is to be dispensed using a thermal inkjet printhead. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the gas generating liquid functional agent in an amount ranging from about 0.1 wt % to about 1 wt % of the total weight of the gas generating liquid functional agent.

In some examples, the balance of the gas generating liquid functional agent is water (e.g., deionized water). In these examples, the amount of water may vary depending upon the weight percent of the other gas generating liquid functional agent components. In other examples, the balance of the gas generating liquid functional agent is a solvent (e.g., any of the previously listed co-solvent(s).

An example formulation of the gas generating liquid functional agent that does not include a binder, and thus may be used in combination with a separate binding agent, is shown in Table 1. This example includes calcium carbonate as the gas precursor compound.

TABLE 1

| Component Type | Specific Components | Actives (wt %) | Target (wt %) | Formulation (wt %) |
|---|---|---|---|---|
| Co-solvent | 1-(2-Hydroxyethyl)-2-pyrrolidone (HE-2P) | 100.00 | 20.00 | 20.00 |
| Surfactant/ Dispersing aid | Silquest ™ Momentive A-1230 | 100.00 | 5.00 | 5.00 |
| | Surfynol ® 465 | 100.00 | 0.40 | 0.40 |
| Antimicrobial | Acticide ® M20 (stock solution) | 10.00 | 0.01 | 0.10 |
| Gas Precursor Compound | Calcium carbonate ($CaCO_3$) 50 nm-100 nm dispersion | 32.00 | 20.00 | 62.50 |
| Water | Deionized Water | — | — | Balance |

As mentioned herein, other examples of the gas generating liquid functional agent are combined agents that may be used to pattern build material to form the build material support structure without using a separate binding agent. In these other examples, the gas generating liquid functional agent (or combined agent) includes the binder, the gas precursor, water or a solvent, co-solvent(s), and surfactant(s) and/or dispersing aid(s), and in some instances, may also include antimicrobial agent(s) and/or anti-kogation agent(s). In these examples, any of the previously described gas precursors, co-solvent(s), surfactant(s) and/or dispersing aid(s), antimicrobial agent(s), and/or anti-kogation agent(s) may be used in any of the given amounts.

Examples of suitable binders include latexes (i.e., an aqueous dispersion of polymer particles), polyvinyl alcohol, polyvinylpyrrolidone, and combinations thereof.

Examples of polyvinyl alcohol include low weight average molecular weight polyvinyl alcohols (e.g., from about 13,000 to about 50,000), such as SELVOL™ PVOH 17 from Sekisui. Examples of polyvinylpyrrolidones include low weight average molecular weight polyvinylpyrrolidones (e.g., from about 15,000 to about 19,000), such as LUVITEC™ K 17 from BASF Corp.

The polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the polymer particles are heteropolymers or co-polymers. The heteropolymers may include a more hydrophobic component and a more hydrophilic component. In these examples, the hydrophilic component renders the particles dispersible in the binder agent 14, while the hydrophobic component is capable of coalescing upon exposure to heat in order to temporarily bind the host metal particles 15.

The polymer particles of the latex may have several different morphologies. The polymer particles may include two different copolymer compositions, which may be fully separated core-shell polymers, partially occluded mixtures, or intimately comingled as a polymer solution. In an example, the polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. For another example, the polymer particle morphology may resemble a raspberry, in which a hydrophobic core is surrounded by several smaller hydrophilic particles that are attached to the core. For still another example, the polymer particles may include 2, 3, or 4 or more relatively large particles that are at least partially attached to one another or that surround a smaller polymer core. The polymer particles of the latex may have a single phase morphology, may be partially occluded, may be multiple-lobed, or may include any combination of any of the morphologies disclosed herein.

The latex polymer particles may have a weight average molecular weight ranging from about 5,000 to about 500,000. As examples, the weight average molecular weight of the latex particles may range from about 10,000 to about 500,000, from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. As used herein, typical ambient conditions include a temperature range from about 20° C. to about 25° C., an atmospheric pressure of about 100 kPa (kilopascals), and a relative humidity ranging from about 30% to about 90%. The glass transition temperature of the latex particles may range from about −20° C. to about 130° C., or in a specific example, from about 60° C. to about 105° C.

Examples of monomers that may be used to form the hydrophobic component include low $T_g$ monomers. Some examples include $C_4$ to $C_8$ alkyl acrylates or methacrylates, styrene, substituted methyl styrenes, polyol acrylates or methacrylates, vinyl monomers, vinyl esters, ethylene, maleate esters, fumarate esters, itaconate esters, or the like.

Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In an example, the selected monomer(s) is/are polymerized to form a polymer, heteropolymer, or copolymer. In some examples, the monomer(s) are polymerized with a co-polymerizable surfactant. In some examples, the co-polymerizable surfactant can be a polyoxyethylene compound. In some examples, the co-polymerizable surfactant can be a HITENOL® compound e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

The polymer particles may have a particle size that can be jetted via thermal inkjet printing or piezoelectric printing or continuous inkjet printing. In an example, the particle size of the polymer particles ranges from about 10 nm to about 300 nm.

Any suitable polymerization process may be used. In examples, the aqueous dispersion of polymer particles (latexes) may be produced by emulsion polymerization or co-polymerization of any of the previously listed monomers.

In an example, the polymer particles may be prepared by polymerizing high $T_g$ hydrophilic monomers to form the high $T_g$ hydrophilic component and attaching the high $T_g$ hydrophilic component onto the surface of the low $T_g$ hydrophobic component.

In another example, each of the polymer particles may be prepared by polymerizing the low $T_g$ hydrophobic monomers and the high $T_g$ hydrophilic monomers at a ratio of the low $T_g$ hydrophobic monomers to the high $T_g$ hydrophilic monomers that ranges from 5:95 to 30:70. In this example, the soft low $T_g$ hydrophobic monomers may dissolve in the hard high $T_g$ hydrophilic monomers.

In still another example, each of the polymer particles may be prepared by starting the polymerization process with the low $T_g$ hydrophobic monomers, then adding the high $T_g$ hydrophilic monomers, and then finishing the polymerization process. In this example, the polymerization process may cause a higher concentration of the high $T_g$ hydrophilic monomers to polymerize at or near the surface of the low $T_g$ hydrophobic component.

In still another example, each of the polymer particles may be prepared by starting a copolymerization process with the low $T_g$ hydrophobic monomers and the high $T_g$ hydrophilic monomers, then adding additional high $T_g$ hydrophilic monomers, and then finishing the copolymerization process. In this example, the copolymerization process may cause a higher concentration of the high $T_g$ hydrophilic monomers to copolymerize at or near the surface of the low $T_g$ hydrophobic component.

Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

The low $T_g$ hydrophobic monomers and/or the high $T_g$ hydrophilic monomers used in any of these example methods may be any of the low $T_g$ hydrophobic monomers and/or the high $T_g$ hydrophilic monomers (respectively) listed above. In an example, the low $T_g$ hydrophobic monomers are selected from the group consisting of $C_4$ to $C_8$ alkyl acrylate monomers, $C_4$ to $C_8$ alkyl I methacrylate monomers, styrene monomers, substituted methyl styrene monomers, vinyl monomers, vinyl ester monomers, and combinations thereof; and the high $T_g$ hydrophilic monomers are selected from the group consisting of acidic monomers, unsubstituted amide monomers, alcoholic acrylate monomers, alcoholic methacrylate monomers, $C_1$ to $C_2$ alkyl acrylate monomers, $C_1$ to $C_2$ alkyl methacrylate monomers, and combinations thereof.

The resulting polymer particles may exhibit a core-shell structure, a mixed or intermingled polymeric structure, or some other morphology.

In some examples, the polymer particles have a MFFT or a glass transition temperature ($T_g$) that is greater (e.g., >) than ambient temperature. In other examples, the polymer particles have a MFFT or $T_g$ that is much greater (e.g., >>) than ambient temperature (i.e., at least 15° higher than ambient). As mentioned herein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The MFFT or the $T_g$ of the bulk material (e.g., the more hydrophobic portion) of the polymer particles may range from 25° C. to about 125° C. In an example, the MFFT or the $T_g$ of the bulk material (e.g., the more hydrophobic portion) of the polymer particles is about 40° C. or higher. The MFFT or the $T_g$ of the bulk material may be any temperature that enables the polymer particles to be inkjet printed without becoming too soft at the printer operating temperatures.

The polymer particles may have a MFFT or $T_g$ ranging from about 125° C. to about 200° C. In an example, the polymer particles may have a MFFT or $T_g$ of about 160° C.

In an example, the binder is present in the combined agent in an amount ranging from about 1 wt % to about 30 wt % based on a total weight of the combined agent. In another example, the binder is present in the combined agent in an amount ranging from about 2 wt % to about 25 wt % based on the total weight of combined agent. As shown in Table 2 below, these percentages may include both active binder and other non-active components present with the binder. Active binder, for example, may be in the range of, e.g., about 1 wt % and about 15 wt %.

In examples of the combined agent, it is desirable that the total volume fraction of solids be about 50 vol. % or less, so that the combined agent is jettable via the desired inkjet printhead (e.g., thermal inkjet printhead, piezoelectric inkjet printhead, etc.). As such, the volume fraction of the gas precursor compound and the binder may be adjusted so that together, the components do not exceed, for example, from about 40 vol. % to about 50 vol. % of the total volume of the combined agent.

An example formulation of the gas generating liquid functional agent that does include a binder, and thus may be used without a separate binding agent, is shown in Table 2. This example includes calcium carbonate as the gas precursor compound.

TABLE 2

| Component Type | Specific Components | Actives (wt %) | Target (wt %) | Formulation (wt %) |
|---|---|---|---|---|
| Co-solvent | 2-methyl-1,3-propanediol | 99.00 | 9.60 | 9.70 |
|  | 2-pyrrolidinone | 95.00 | 17.00 | 17.89 |
| Surfactant/ Dispersing aid | Tergitol ® 15-S-7 | 100.00 | 0.90 | 0.90 |
| Antimicrobial | Acticide ® M20 (stock solution) | 10.00 | 0.01 | 0.10 |
| Gas Precursor Compound | Calcium carbonate ($CaCO_3$) 50 nm-100 nm dispersion | 32.00 | 15.00 | 46.88 |
| Binder | Acrylic latex dispersion | 41.40 | 9.00 | 21.74 |
| Water | Deionized Water | — | — | 2.79 |

Binding Liquid Functional Agent

The binding liquid functional agent (i.e., binding agent) may be used to pattern build material where it is desirable to form the 3D object. The binding agent may also be used in combination with examples of the gas generating liquid functional agent that do not include a binder to pattern build material where it is desirable to form the build material support structure.

The binding agent includes the binder. Any of the binders set forth herein for examples of the combined agent may be used in the binding agent. In an example, the binder is present in the binding agent in an amount ranging from about 1 wt % to about 30 wt % based on a total weight of the binding agent. In another example, the binder is present in the binding agent in an amount ranging from about 2 wt % to about 20 wt % based on the total weight of binding agent. These percentages may include active binder, and the percentages may be higher when other non-active components are considered (e.g., in Table 3).

In addition to the binder, the binding agent may also include water, co-solvent(s), surfactant(s) and/or dispersing aid(s), antimicrobial agent(s), and/or anti-kogation agent(s). In these examples, any of the previously described co-solvent(s), surfactant(s) and/or dispersing aid(s), antimicrobial agent(s), and/or anti-kogation agent(s) may be used in any of the given amounts, except that the weight percentages are with respect to a total weight of the binding agent.

The composition of the binding liquid functional agent is similar to examples of the gas generating liquid functional agent except that the gas precursor compound(s) is excluded from the formulation of the binding liquid functional agent.

An example formulation of the binding liquid functional agent is shown in Table 3.

TABLE 3

| Component Type | Components | Actives (wt %) | Target (wt %) | Formulation (wt %) |
|---|---|---|---|---|
| Co-solvent | 2-methyl-1,3-propanediol | 99.00 | 9.60 | 9.70 |
|  | 2-pyrrolidinone | 95.00 | 17.00 | 17.89 |
| Surfactant/ Dispersing aid | Tergitol ® 15-S-7 | 100.00 | 0.90 | 0.90 |
| Antimicrobial | Acticide ® M20 (stock solution) | 10.00 | 0.01 | 0.1 |
| Binder | Acrylic latex dispersion | 41.40 | 16.00 | 38.65 |
| Water | Deionized Water | — | — | Balance |

Methods

An example of the 3D printing method 100, in which a gas generating liquid functional agent and a binding agent are used, is depicted in FIG. 1. Generally, the method 100 includes patterning build material layers to form an intermediate structure, the patterning including: selectively applying a binding agent to define a patterned intermediate part; and selectively applying i) the binding agent and a separate agent including a gas precursor or ii) a combined agent including a binder and the gas precursor to define a build material support structure adjacent to at least a portion of the patterned intermediate part (reference numeral 102); and heating the intermediate structure to a temperature that activates the gas precursor to create gas pockets in the build material support structure (reference numeral 104).

Any examples of the build material, the binding agent, and the gas generating liquid functional agent described herein may be used in the method 100. Furthermore, the method 100 may be used to form 3D objects and irreversibly breakable 3D support structures of any size and/or shape, as long as one surface of the irreversibly breakable 3D support structure is directly adjacent to one surface of the 3D object, and the irreversibly breakable 3D support structure can be readily removed from the 3D object via sand blasting, bead blasting, etc.

At reference numeral 102 in FIG. 1, build material layers are patterned to form the intermediate structure, which is ultimately heated to form the 3D object and the irreversibly breakable 3D support structure. FIGS. 2A through 2E depict various examples of the intermediate structures 40A, 40B, 40C, 40D, 40E that may be made using the method 100.

In an example, patterning the build material layers includes: iteratively applying individual build material layers 12, 12A, 12B, etc.; selectively applying the binding agent to at least some, or to each, of the individual build material layers to define several layers of the patterned intermediate part 25; and selectively applying i) the binding agent and the separate agent or ii) the combined agent to at least some, or to each, of the individual build material layers to define several layers of the build material support structure 23. In each of the examples, at least one surface of the intermediate part 25 is directly adjacent to at least one surface of the build material support structure 23, but in some examples (see FIGS. 2B through 2D), one or more layers of non-patterned build material 28 separate other surface(s) of the build material support structure 23 from other surface(s) of the patterned intermediate part 25.

In the examples shown in FIGS. 2A through 2E, several build material layers 12, 12A, 12B . . . 12H (FIG. 2A), etc. have been applied and patterned to define different examples of the build material support structure 23 and the patterned intermediate part 25. Repeated application and patterning may be performed until the total number of build material layers that are patterned form a complete build material support structure 23 according to a 3D model of the irreversibly breakable 3D support structure and a complete patterned intermediate part 25 according to a 3D model of the 3D object.

The build material 14 may be spread to form the layers 12, 12A, 12B, etc. on a build area platform 16, and the respective layers 12, 12A, 12B, etc. may be patterned with the binding agent and/or an example of the gas generating liquid functional agent one layer at a time. Examples of the spreading of the build material 14 and the application of the various agents to pattern are described in more detail in reference to FIGS. 3A-3I. The agent(s) used to pattern any individual build material layer 12, 12A, 12B, etc. will depend upon whether the patterned portion is part of the build material support structure 23 or part of the patterned intermediate part 25. The binding agent is used to pattern the patterned intermediate part 25, and either i) the binding agent and the separate agent including the gas precursor or ii) the combined agent including both the binder and the gas precursor is used to pattern the build material support structure 23.

As shown in FIGS. 2A through 2D, the patterned intermediate part 25 at least partially overlies the build material support structure 23. In these examples, the build material support structure 23 provides support for at least some of the build material 14 of the patterned intermediate part 25 during the patterning process and during the subsequent heating process.

Figure 2A:
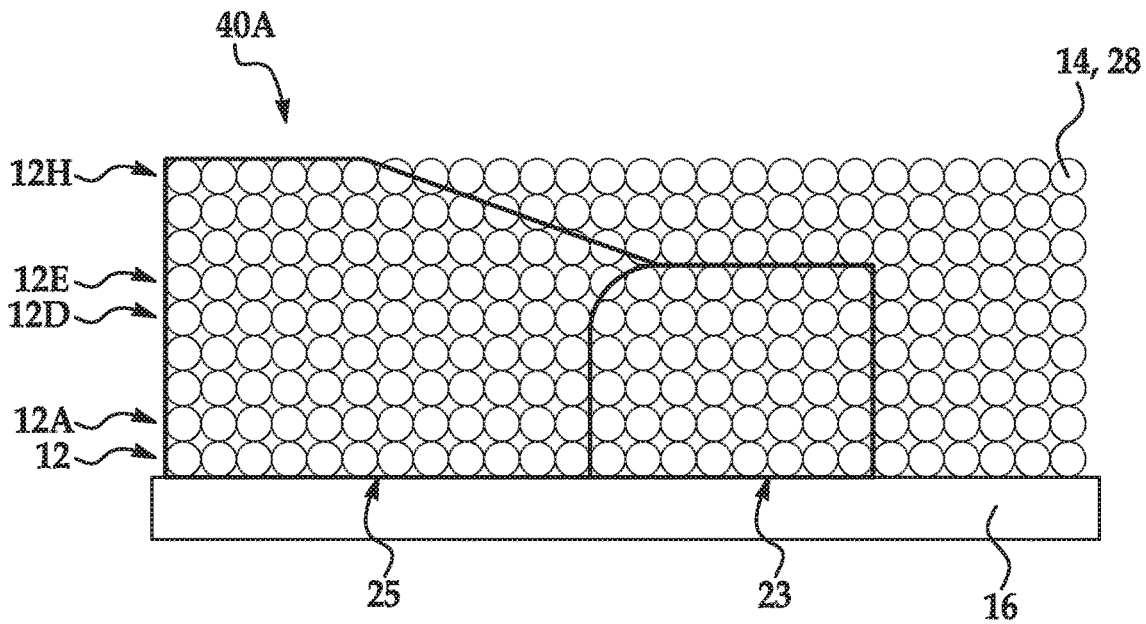
FIGS. 2A through 2E are schematic views of different examples of intermediate structures, each of which includes a build material support structure adjacent to an intermediate part.

In the example shown in FIG. 2A, the surface of the build material support structure 23 that is adjacent to the surface of the patterned intermediate part 25 is build up vertically and then is curved. At the curved portion, the patterned intermediate part 25 overlies a portion of the build material support structure 23. As such, the build material support structure 23 provides support at least for the curved portion of the patterned intermediate part 25. To form this intermediate structure 40A, the binder agent is selectively applied on layers 12 through 12H to define the patterned intermediate part 25; and either i) the binding agent and the separate agent including the gas precursor or ii) the combined agent is selectively applied on layers 12 through 12E to define the build material support structure 23.

Figure 2B:
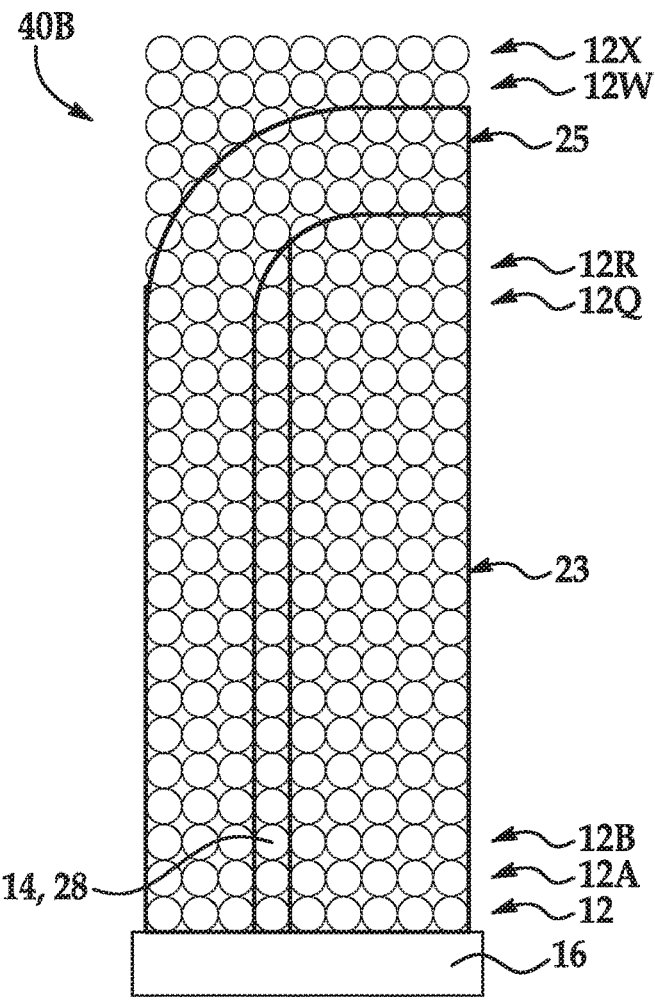

In the example shown in FIG. 2B, the surface of the build material support structure 23 that is adjacent to the surface of the patterned intermediate part 25 is substantially horizontally oriented (e.g., with respect to the surface of the build area platform 16). In this example, a portion of the patterned intermediate part 25 completely overlies, and thus is supported by the build material support structure 23. To form this intermediate structure 40B, the binder agent is selectively applied on layers 12 through 12V to define the patterned intermediate part 25; and either i) the binding agent and the separate agent including the gas precursor or ii) the combined agent is selectively applied on layers 12 through 12S to define the build material support structure 23. Also in this example, some of the build material 14 between the patterned intermediate part 25 and the build material support structure 23 remains non-patterned (shown at reference numeral 28). The non-patterned build material 28 can be easily removed after patterning and before heating, and thus can create a space between the patterned intermediate part 25 and the build material support structure 23.

Figure 2C:
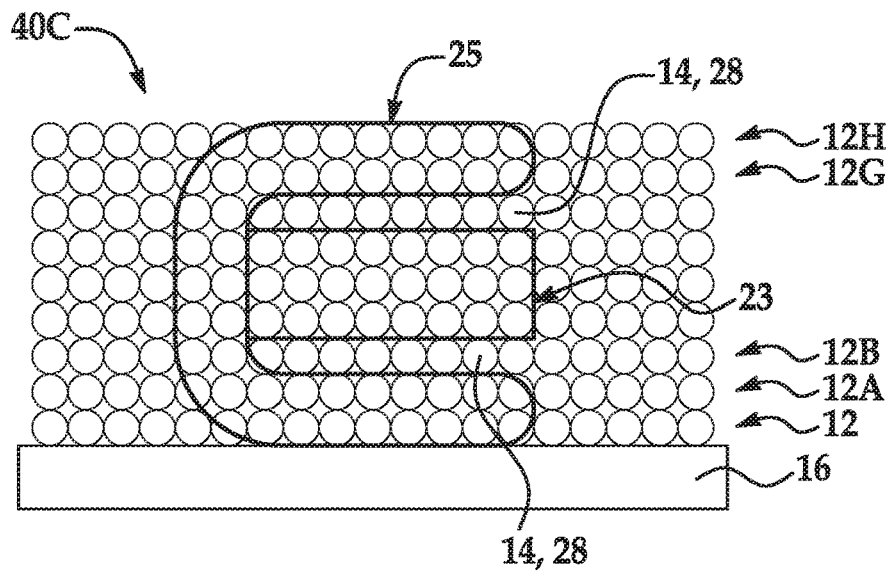

In the example shown in FIG. 2C, the surface of the build material support structure 23 that is adjacent to the surface of the patterned intermediate part 25 is build up substantially vertically (although the interface between the surfaces is somewhat curved). To form this intermediate structure 40C, the binder agent is selectively applied on layers 12 through 12H to define the patterned intermediate part 25; and either i) the binding agent and the separate agent including the gas precursor or ii) the combined agent is selectively applied on layers 12C through 12E to define the build material support structure 23. Also in this example, some of the build material 14 between the patterned intermediate part 25 and the build material support structure 23 remains non-patterned 28, and thus can create spaces between the patterned intermediate part 25 and the build material support structure 23. In this example, the build material support structure 23, in combination with the non-patterned build material 28, provides support for the overlying portion of the patterned intermediate part 25 formed thereon during patterning.

In the example shown in FIG. 2C, the intermediate structure 40C can be extracted from any non-patterned build material 14, 28 surrounding the structure 40C and in the spaces, and then rotated (e.g., 90°) so that the build material support structure 23 contacts a surface of a heating mechanism and so that the curved center portion of the horseshoe or C-shaped part is substantially parallel to the surface of the heating mechanism. In these examples, the build material support structure 23 provides support for a different portion of the patterned intermediate part 25 during heating than during patterning.

Figure 2D:
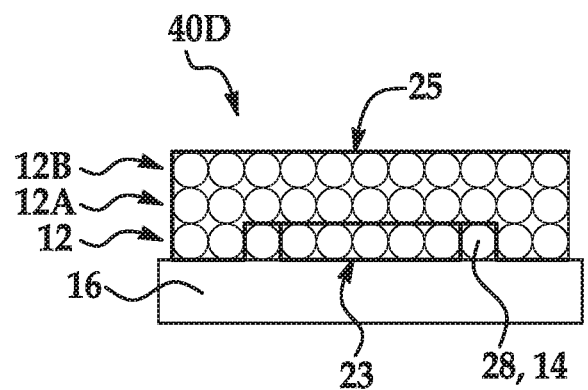

In the example shown in FIG. 2D, the build material support structure 23 is a single layer structure, and the patterned intermediate part 25 at least partially overlies the single layer structure. In the example shown in FIG. 2D, the surface of the build material support structure 23 that is adjacent to the surface of the patterned intermediate part 25 is substantially horizontally oriented (e.g., with respect to the surface of the build area platform 16). To form this intermediate structure 40D, the binder agent is selectively applied on layers 12 through 12B to define the patterned intermediate part 25; and either i) the binding agent and the separate agent including the gas precursor or ii) the combined agent is selectively applied on layer 12 to define the build material support structure 23. Also in this example, some of the build material 14 between the patterned intermediate part 25 and the build material support structure 23 remains non-patterned 28, and thus can create spaces between the patterned intermediate part 25 and the build material support structure 23. In this example, the build material support structure 23, in combination with the non-patterned build material 28, provides support for the overlying portion of the patterned intermediate part 25 formed thereon.

Figure 2E:
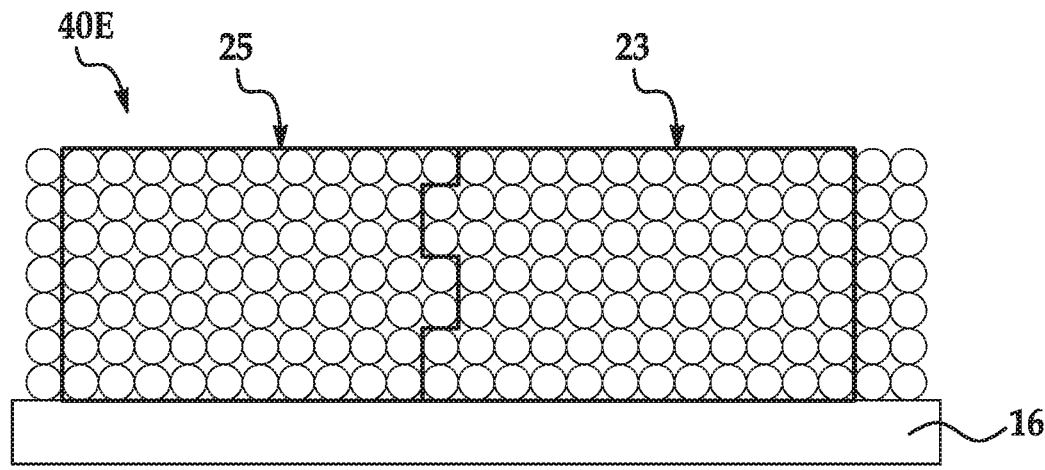

As shown in FIG. 2E, one entire surface of the build material support structure 23 is directly adjacent to one entire surface of the patterned intermediate part 25, and there is no non-patterned build material 28 between the build material support structure 23 and the patterned intermediate part 25. In this example, the interface between the two surfaces generally extends vertically from the surface of the build area platform 16, although there are some vertical portions and some horizontal portions. Except that the horizontal portions along the interface, the build material support structure 23 does not provide support for the patterned intermediate part 25 during patterning.

In the example shown in FIG. 2E, the intermediate structure 40E can be extracted from any non-patterned build material 14, 28 surrounding the structure 40E, and then rotated (e.g., 90°) so that the build material support structure 23 contacts a surface of a heating mechanism and so that the patterned intermediate structure 25 does not contact the surface of the heating mechanism. In these examples, the build material support structure 23 provides support for the patterned intermediate part 25 during heating.

Several examples of the intermediate structure 40 and the build material support structure 23 have been illustrated in FIGS. 2A through 2E. It is to be understood that the components 23, 25 of the intermediate structure 40 may have other configurations, as long as the geometry of the irreversibly breakable 3D support structure can be broken to separate it from the 3D object.

Another, more specific example of the 3D printing method 100 is shown in FIGS. 3A through 3I. Any examples of the build material, the binding agent, and the gas generating liquid functional agent described herein may be used in this example of the method 100. Moreover, the printing system 60, shown in FIG. 4, will be discussed in detail in conjunction with FIGS. 3A through 3I.

In this example of the method, patterning the build material layers includes selectively applying i) the binding agent 18 and a separate agent 21 including a gas precursor or ii) a combined agent 19 including a binder and the gas precursor on a portion 20 of an initial build material layer 12, thereby forming a layer 22 of the build material support structure 23 (see FIGS. 3A and 3B); selectively applying the binding agent 18 on another portion 24 of the initial build material layer 12 to define a layer 26 of the patterned intermediate part 25, wherein the layer 22 of the build material support structure 23 and the layer 26 of the patterned intermediate part 25 are separated by non-patterned build material 28 (see FIGS. 3A and 3B); and forming a remaining portion of the patterned intermediate part 25 on the build material support structure 23 (see FIGS. 3D and 3E), thereby forming the intermediate structure 40 (FIG. 3E) including the patterned intermediate part 25 and the build material support structure 23 temporarily bound together.

Figure 3A:
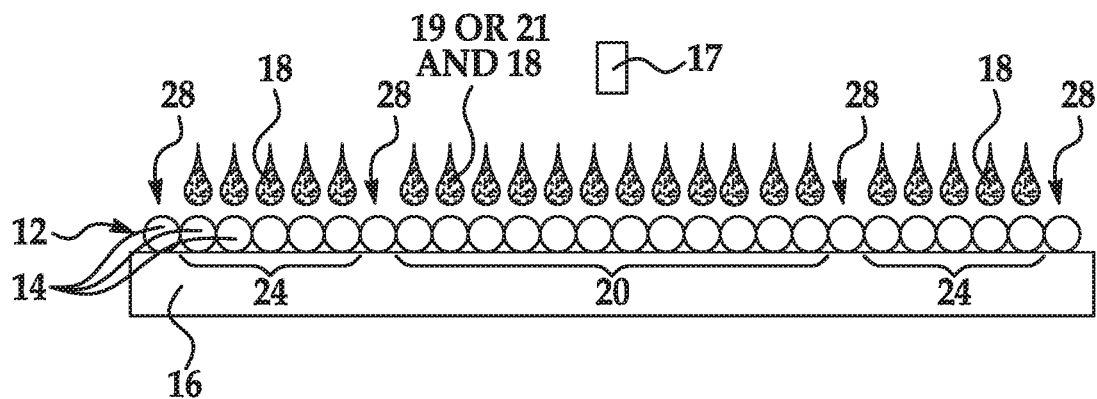
FIGS. 3A through 3I are schematic and partially cross-sectional views depicting the formation of a 3D object and a 3D support structure using an example of the 3D printing method disclosed herein.
Figure 3B:
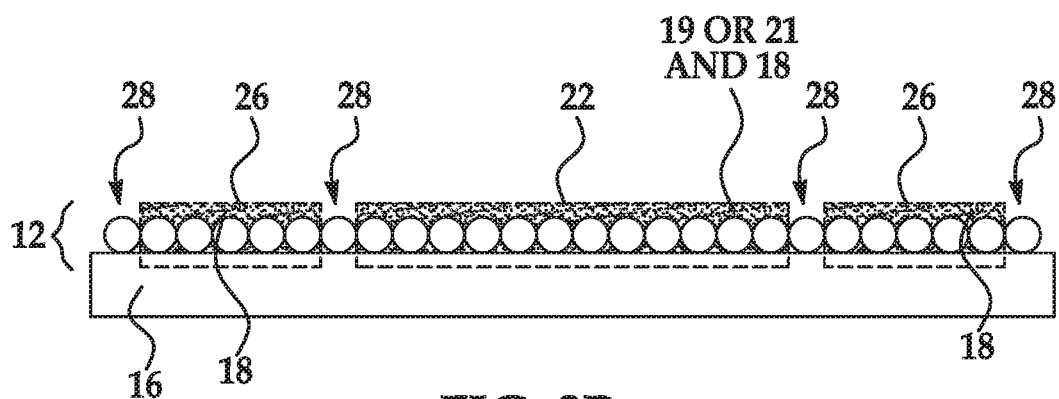

An example of the patterning of the initial build material layer 12 is shown in cross-section in FIGS. 3A and 3B. Prior to patterning, build material particles 14 may be applied to form the layer 12, and then the layer 12 may be patterned. In the example shown in FIG. 3A, one build material layer 12 including build material particles 14 has been deposited on (i.e., applied to, formed on, etc.) the build area platform 16 and patterned.

Figure 4:
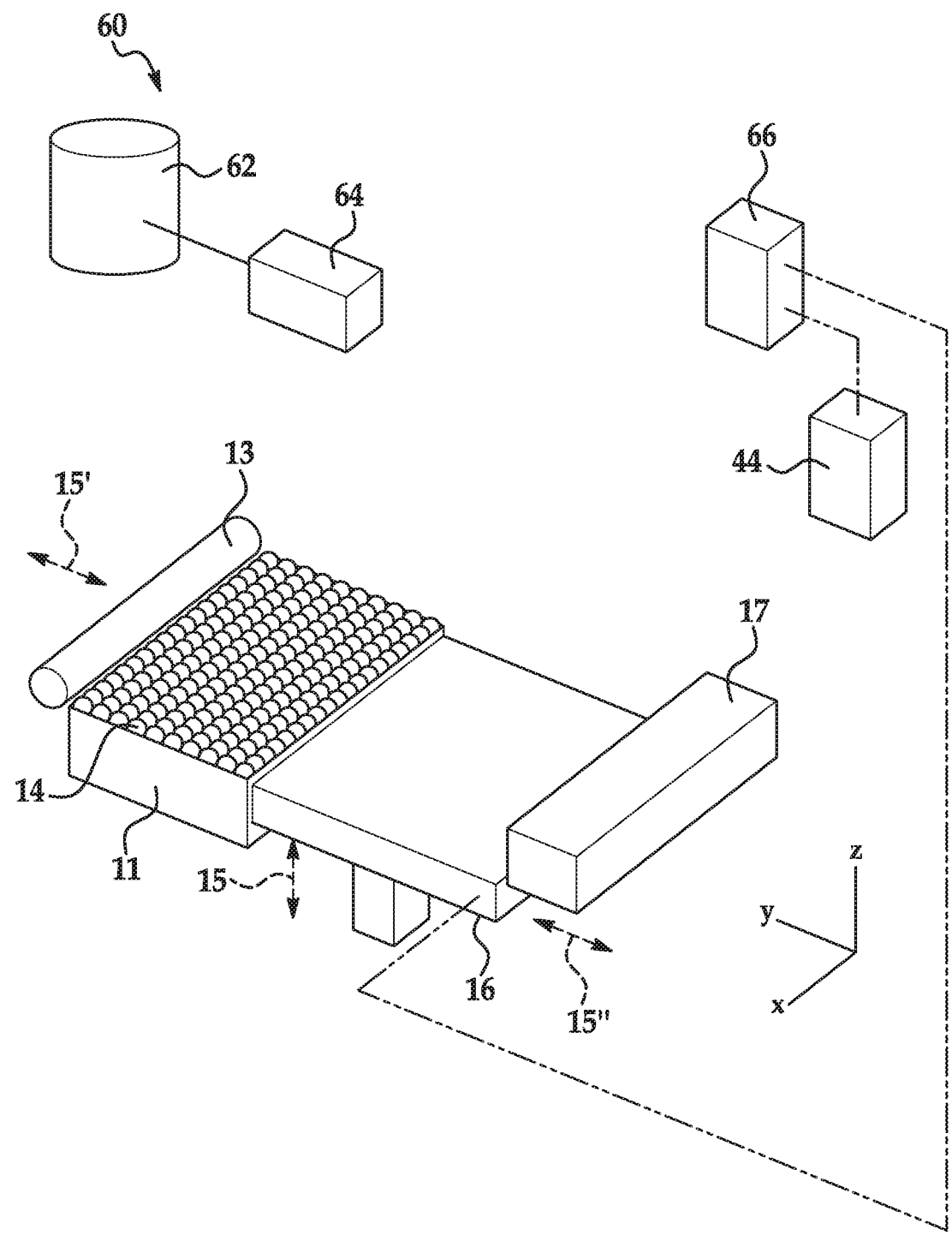
FIG. 4 is a simplified isometric and schematic view of an example of a 3D printing system disclosed herein.

Forming and patterning the initial build material layer 12 may include the use of the printing system 60 (FIG. 4). The printing system 60 may include the build area platform 16, a build material supply 11 containing build material particles 14, a build material distributor 13, and an applicator 17.

The build area platform 16 receives the build material particles 14 from the build material supply 11. The build area platform 16 may be moved in the directions as denoted by the arrow 15 (FIG. 4), e.g., along the z-axis, so that the build material particles 14 may be delivered to the build area platform 16 or to a previously patterned layer (see, e.g., FIG. 3C). In an example, when the build material particles 14 are to be delivered, the build area platform 16 may be programmed to advance (e.g., downward) enough so that the build material distributor 13 can push the build material particles 14 onto the build area platform 16 to form a substantially uniform build material layer 12 thereon. The build area platform 16 may also be returned to its original position, for example, when a new object is to be built.

The build material supply 11 may be a container, bed, or other surface that is to position the build material particles 14 between the build material distributor 13 and the build area platform 16.

The build material distributor 13 may be moved in the directions as denoted by the arrow 15' (FIG. 4), over the build material supply 11 and across the build area platform 16 to spread the build material particles 14 over the build area platform 16. The build material distributor 13 may also be returned to a position adjacent to the build material supply 11 following the spreading of the build material particles 14. The build material distributor 13 may be a blade (e.g., a doctor blade), a roller, a combination of a roller and a blade, and/or any other device capable of spreading the build material 16 over the build area platform 16. For instance, the build material distributor 13 may be a counter-rotating roller. In some examples, the build material supply 11 or a portion of the build material supply 11 may translate along with the build material distributor 13 such that build material particles 14 are delivered continuously to the material distributor 13, rather than being supplied from a single location (as shown in FIG. 4).

A controller (shown as 62 in FIG. 4) may process build material supply data, and in response, may control the build material supply 11 to appropriately position the build material particles 14, and may process spreader data, and in response, may control the build material distributor 13 to spread the supplied build material particles 14 over the build area platform 16 to form the initial build material layer 12 thereon. As shown in FIG. 3A, one (the initial) build material layer 12 has been formed. The layers 12, 12A, etc. shown in FIGS. 2A through 2E may be formed in a similar manner.

The build material layer 12 has a substantially uniform thickness across the build area platform 16. In an example, the thickness of the build material layer 12 ranges from about 90 μm to about 110 μm, although thinner or thicker layers may be used. For example, the thickness of the build material layer 12 may range from about 50 μm to about 200 μm. In another example, the thickness of the build material layer 12 ranges from about 30 μm to about 300 μm. In yet another example, the thickness of the build material layer 12 may range from about 20 μm to about 500 μm. The layer 12 thickness may be about 2× (i.e., 2 times) the particle diameter at a minimum for finer part definition. In some examples, the layer 12 thickness may be about 1.2× the particle diameter.

In the example shown in FIG. 3A, the binding agent 18 is selectively applied to the portion(s) 24 of the build material layer 12 in order to pattern a first patterned layer (26, FIG. 3B) of the patterned intermediate part 25. The portion(s) 24 of the initial build material layer 12 to which the binding agent 18 is selectively applied may be respectively defined by a 3D model of the 3D object that is to be formed. The binding agent 18 is deposited interstitially in the openings or voids between the build material particles 14. Capillary flow can move the binding agent 18 between the individual build material particles 14 in the areas 24.

Figure 3C:
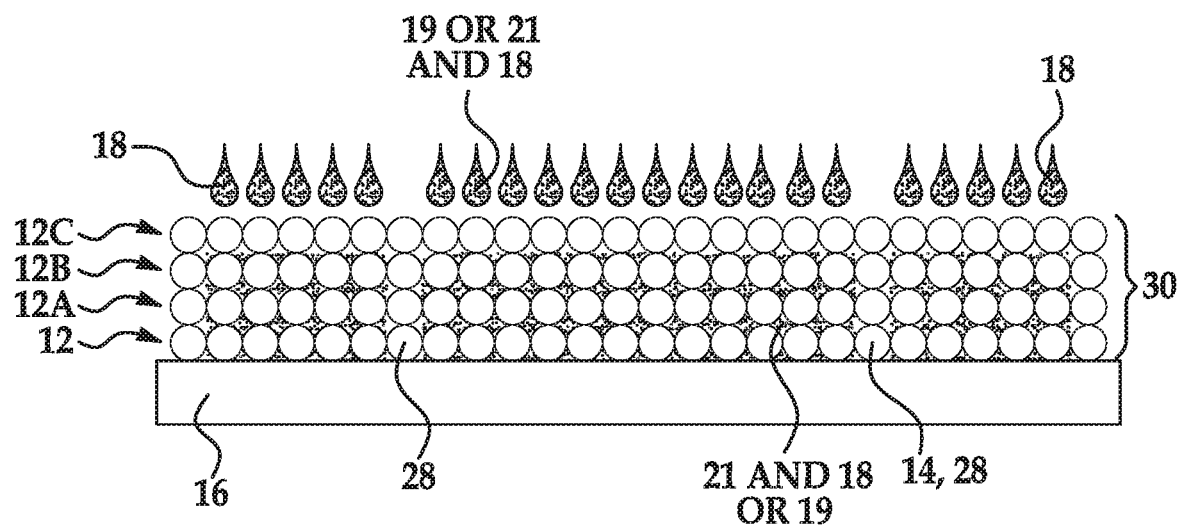
Figure 3D:
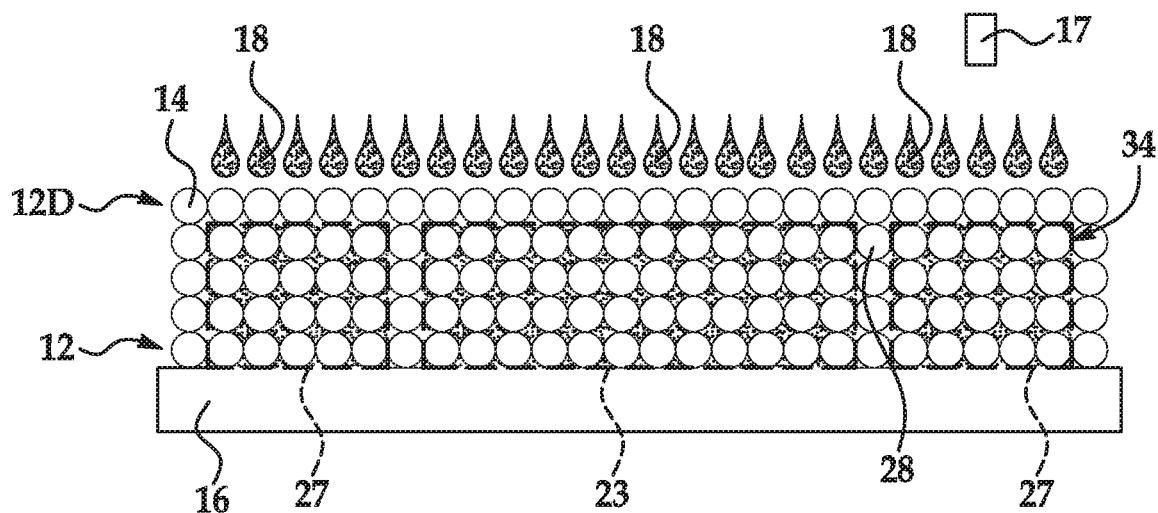

Also in the example shown in FIG. 3A, (i) the binding agent 18 and a separate agent 21 including a gas precursor and not including a binder (i.e., one example of the gas generating liquid functional agent disclosed herein), or (ii) a combined agent 19 including the binder and the gas precursor (i.e., another example of the gas generating liquid functional agent disclosed herein) is/are selectively applied to the portion(s) 20 of the build material layer 12 in order to pattern a first patterned layer (22, FIG. 3B) of the build material support structure 23 (shown in FIG. 3D).

Any example of the binding agent 18 described herein may be utilized in combination with any example of the separate gas generating liquid functional agent 21 that does not include a binder in order to define the build material support structure 23. The binder from the binding agent 18 can temporarily bind the build material particles 14 of the build material support structure 23 and the gas precursor of the separate gas generating liquid functional agent 21 forms gas pockets 36 (FIGS. 3G and 3H) within the irreversibly breakable 3D support structure 48 (FIG. 3H) that is formed during sintering.

When the agents 18 and 21 are used to define the build material support structure 23, the binding agent 18 may be dispensed from the applicator 17, and the separate gas generating liquid functional agent 21 may be dispensed from a separate applicator. The separate applicator may be similar to applicator 17 (i.e., may be a thermal inkjet printhead, a piezoelectric printhead, etc.), and may be operated in the same manner as described hereinbelow. In another example, the applicator 17 may have separate chambers that contain the binding agent 18 and the separate gas generating liquid functional agent 21, and may also have separate printheads, nozzles, etc. to separately and selectively dispense the two agents 18, 21. In these examples, the applicator(s) may be programmed to receive commands from the controller 62 and to deposit the agents 18 and 21 according to a 3D object model of the irreversibly breakable 3D support structure 48. In the example shown in FIG. 3A, the applicator(s) sequentially or simultaneously apply the agents 18 and 21 to the build material particles 14 of the layer 12. The agents 18 and 21 are deposited interstitially in the openings or voids between the build material particles 14. Capillary flow can move the agents 18 and 21 between the individual build material particles 14 in the layer 12.

Alternatively, any example of the combined agent 19, including both the binder and the gas precursor, may be used to define the build material support structure 23. When the combined agent 19 is used, a separate binding agent 18 is not utilized to define the build material support structure 23. In these examples, the binder from the combined agent 19 can temporarily bind the build material particles 14 of the build material support structure 23 and the gas precursor of the combined agent 19 forms gas pockets 36 (FIGS. 3G and 3H) within the irreversibly breakable 3D support structure 48 (FIG. 3H) that is formed during sintering.

When the combined agent 19 is used to define the build material support structure 23, the combined agent 19 may be dispensed from an applicator that is similar to applicator 17 (i.e., may be a thermal inkjet printhead, a piezoelectric printhead, etc.), and that may be operated in the same manner as described hereinbelow for the applicator 17. In another example, the applicator 17 may have separate chambers that contain the combined agent 21 and the binding agent 18 (e.g., used to pattern the patterned intermediate part 25), and may also have separate printheads, nozzles, etc. for separately and selectively dispensing the two agents 19, 18. In these examples, the applicator may be programmed to receive commands from the controller 62 and to deposit the combined agent 19 according to a 3D object model of the irreversibly breakable 3D support structure 48. In the example shown in FIG. 3A, the applicator 17 applies the agent 19 to the build material particles 14 of the layer 12. This defines the first layer 22 of the build material support structure 23. The combined agent 19 is deposited interstitially in the openings or voids between the build material particles 14. Capillary flow can move the agent 19 between the individual build material particles 14 in the layer 12.

The applicator 17 may be used to selectively apply any of the agents 18, 19, 21. The applicator 17 may include nozzles, fluid slots, and/or fluidics for dispensing the agent(s) 18, 19, 21. The applicator 17 may be a thermal inkjet printhead or print bar, a piezoelectric printhead or print bar, or a continuous inkjet printhead or print bar. While a single applicator 17 is shown in FIG. 3A, it is to be understood that multiple applicators 17 may be used.

The applicator 17 may be scanned across the build area platform 16, for example, in the directions as denoted by the arrow 15" in FIG. 4. The applicator 17 may extend a width of the build area platform 16. The applicator 17 may also be scanned along the x-axis, for instance, in configurations in which the applicator 17 does not span the width of the build area platform 16 to enable the applicator 17 to deposit the agent(s) 18, 19, 21 over a large area of a build material layer 12. The applicator 17 may thus be attached to a moving XY stage or a translational carriage that moves the applicator 17 adjacent to the build area platform 16 in order to deposit the agent(s) 18, 19, 21 in predetermined areas 20, 24 of the build material layer 12.

The applicator 17 may deliver drops of the agent(s) 18, 19, 21 at a resolution ranging from about 300 dots per inch (DPI) to about 1200 DPI. In other examples, the applicator 17 may deliver drops of the binding agent 18 at a higher or lower resolution. The drop velocity may range from about 5 m/s to about 24 m/s and the firing frequency may range from about 1 kHz to about 100 kHz. In one example, the volume of each drop may be in the order of about 3 picoliters (pl) to about 18 pl, although it is contemplated that a higher or lower drop volume may be used. In some examples, the applicator 17 is able to deliver variable drop volumes of the agent(s) 18, 19, 21. One example of a suitable printhead has 600 DPI resolution and can deliver drop volumes ranging from about 6 pl to about 14 pl.

In the example shown in FIGS. 3A and 3B, it is desirable for the patterned layers 22, 26 to be separated by non-patterned build material 28, (i.e., particles 14 without any binding agent 18 applied thereto) so that the layers 22, 26 are not in direct contact with one another. The non-patterned build material 28 is not intended to be used in forming the build material support structure 23 or the patterned intermediate part 25. In this example, as shown in FIGS. 3A and 3B, some of the non-patterned build material 28 is located at the outer edges of the patterned layer 26 of the patterned intermediate part 25. The build material particles 14 that are directly adjacent to the edges of the build area platform 16 may be exposed to a different environment (a metal wall, air, etc.) than the build material particles 14 that are surrounded by other build material particles 14. The different environment can lead to non-uniformity at the edges. As such, it may be desirable to have non-patterned build material 28 at the outer edges of the patterned layer 26.

Referring specifically now to FIG. 3B, the selective application of the binding agent 18 onto the build material particles 14 within the area 24 results in the formation of a patterned layer 26, which is to become part of a patterned intermediate part 25 (FIG. 3E), which is ultimately to be sintered to form the 3D object/part. More particularly, in the example shown in FIG. 3B, the patterned layer 26 is the first layer of the 3D object being formed. Similarly, as shown in FIG. 3B, the selective application of i) the binding agent 18 and the separate agent 21, or (ii) the combined agent 19 onto the build material particles 14 within the area 20 results in the formation of a patterned layer 22, which is to become part of the build material support structure 23 (FIG. 3D), and ultimately part of the irreversibly breakable 3D support structure 48 (FIG. 3H).

In examples of the method 100 where the build material support structure 23 is a single layer, the method 100 may continue with forming the remaining portion of the intermediate part 25 and then heating, as described herein in reference to FIGS. 3D through 3H.

In other examples, the build material support structure 23 (FIG. 3D) is a multi-layer structure, and thus the method 100 may further include, prior to forming the remaining portion of the intermediate part 25, iteratively applying additional build material layers (e.g., 12A, 12B, 12C, shown in FIG. 3C), selectively applying i) the binding agent 18 and the separate agent 21, or (ii) the combined agent 19 to some of the additional build material layers 12A, 12B, 12C to define several layers of the build material support structure 23, and selectively applying the binding agent 18 to some of the additional build material layers 12A, 12B, 12C to define several layers of a region 27 (FIG. 3D) of the patterned intermediate part 25, wherein the several layers of the build material support structure 23 and the several layers of the region 27 of the patterned intermediate part 25, wherein the several layers of the build material support structure 23 and the several layers of the region 27 of the patterned intermediate part 25 are separated by additional non-patterned build material 28.

FIG. 3C depicts the repeated application of build material particles 14 to form the other build material layers 12A, 12B, 12C and the repeated patterning of these additional build material layers 12A, 12B, 12C over the initial layer 12 of patterned build material. As mentioned above and as shown in FIGS. 3C and 3D, repeated application and patterning may be performed to iteratively build additional layers of the build material support structure 23, as well as additional layers of the region 27 of the patterned intermediate part 25. Repeated application and patterning may be performed until the total number of build material layers 30 that are patterned form a complete build material support structure 23 according to a 3D object model of the irreversibly breakable 3D support structure 48 (FIG. 3H). As such, the total number of build material layers 30 that are patterned will depend on the desired dimensions of the build material support structure 23 and the ultimately formed irreversibly breakable 3D support structure 48. In the example depicted in FIGS. 3C and 3D, four build material layers 12, 12A, 12B, 12C are applied and patterned to form the complete build material support structure 23.

Also shown in FIGS. 3C and 3D, the applicator 17 selectively applies the binding agent 18 on those portion(s) of the build material layers 12A, 12B, 12C in order to define the region 27 of the patterned intermediate part 25, with layer 12C being the outer layer 34 of the region 27. In these examples, the applicator 17 may be programmed to receive commands from the controller 62 and to deposit the binding agent 18 according to a 3D object model of the 3D object being formed.

Figure 3E:
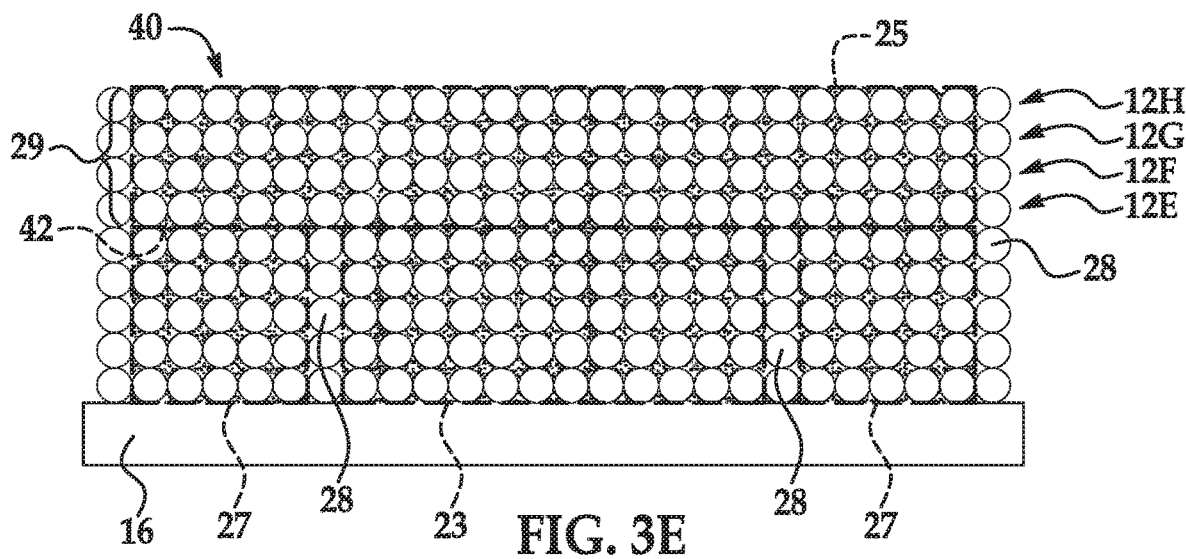

As shown in FIGS. 3D and 3E, after the desired total number of build material layers 30 are patterned to form the build material support structure 23, the method 100 continues by forming the remaining portion 29 of the patterned intermediate part 25. Forming the remaining portion 29 of the patterned intermediate part 25 may include applying a further layer 12D of build material on the build material support structure 23 and on the outer layer 34 of the region 27 of the patterned intermediate part 25, and selectively applying the binding agent 18 to the further layer 12D to define a patterned layer 42 of the remaining portion 29 of the patterned intermediate part 25. This patterned layer 42 of the remaining region 29 is in direct contact with at least some of the region 27, so that the regions 27, 29 can be sintered together to form the 3D object. Moreover, this patterned layer 42 of the remaining portion 29 overlies the build material support structure 23, which provides physical support to the patterned layer 42 and any other layers applied and patterned to form the remaining portion 29.

In examples of the method 100 where the remaining portion 29 is a single layer, the method 200 may continue with extracting and heating the intermediate structure 40. In other examples, the remaining portion 29 (FIG. 3E) is a multi-layer structure, and thus the method 100 may further include iteratively applying additional build material layers (e.g., 12E, 12F, 12G, 12H shown in FIG. 3E) and selectively applying the binding agent 18 to the additional build material layers 12E, 12F, 12G, 12H to define several layers of the remaining portion 29 of the patterned intermediate part 25.

After the layer(s) 12E, 12F, 12G, 12H of the remaining portion 29 are patterned, the intermediate structure 40 is formed. The intermediate structure 40 is similar to intermediate structures 40A, 40B, 40C, 40D, or 40E in that each of the structures 40, 40A, 40B, 40C, 40D, 40E includes the patterned intermediate part 25 and build material support structure 23 temporarily bound together. As such, the following discussion of evaporation and heating may be applicable for any intermediate structure 40, 40A, 40B, 40C, 40D, 40E that may be formed by the method 100 disclosed herein.

In any of the examples disclosed herein, the intermediate structure 40, 40A, 40B, 40C, 40D, 40E may be part of a build material cake including the intermediate structure 40, 40A, 40B, 40C, 40D, 40E and any non-patterned build material 28. In the example shown in FIG. 3E, the non-patterned build material 28 may be positioned between surfaces of the patterned intermediate part 25 and surfaces of the build material support structure 23 and/or surrounding the patterned intermediate part 25.

Figure 3F:
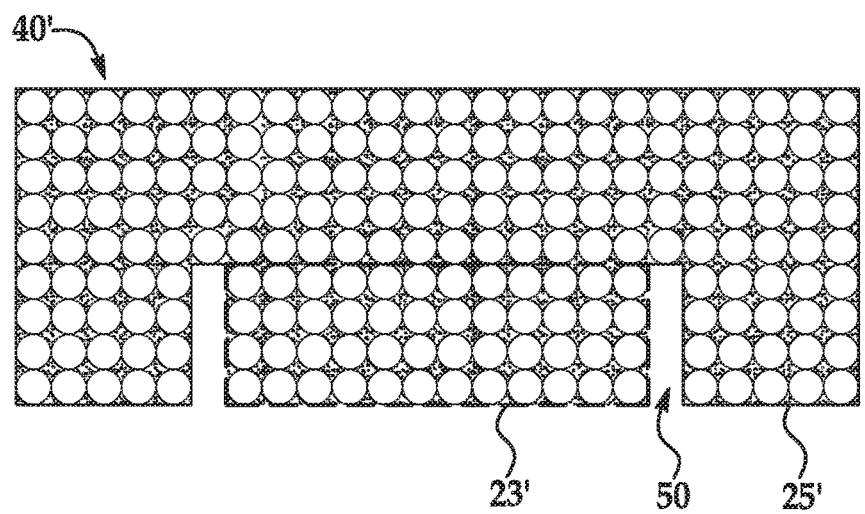

During and/or after the formation of the intermediate structure 40, 40A, 40B, 40C, 40D, 40E, the liquid components of the binding agent 18, and the separate agent 21 or the combined agent 19 may be at least substantially evaporated to form a densified intermediate part 25' and a densified build material support structure 23' (which together make up the densified intermediate structure 40' shown in FIG. 3F). In some examples, the liquid components (e.g., water, solvents) may be substantially evaporated during the layer by layer patterning process and/or while the intermediate structure 40' is on the build area platform, and thus a post excavation baking process may not be used. In these examples, additional heating may be used in order to remove water and solvents, which may activate the binder to generate a densified intermediate structure 40'. In other examples, enough of the liquid components may be evaporated in the layer by layer patterning process and/or while the intermediate structure 40' is on the build area platform to render the structure 40' handleable, and then a post excavation baking process may be used to remove additional solvent and activate the binder to generate the densified intermediate structure 40'.

It is to be understood that at least substantial evaporation of the liquid components may be partial evaporation or complete evaporation. At least substantial evaporation may be partial evaporation when the presence of residual liquid components does not deleteriously affect the desired structural integrity of the intermediate structure 40 or the final 3D object that is being formed. As an example, the densified intermediate part 25' formed by the at least substantial evaporation of the liquid components of the agent(s) 18 may contain a residual amount of the agent 18, but the agent 18 is completely removed during subsequent heating.

As mentioned, at least substantial evaporation of the liquid components (e.g., water and solvents) also activates the binder in the binding agent 18, and when used, in the combined agent 19. In some examples, accelerated evaporation and binder activation may occur when heating to a glass transition temperature or a minimum film formation temperature of the binder. When activated, the binder coalesces and forms a polymer glue that coats and binds together the build material particles 14 patterned with the binding agent 18, and when used, the combined agent 19. At least substantial evaporation of the liquid components also may result in the densification of the patterned build material particles 14 through capillary compaction. As such, at least substantial evaporation forms the densified intermediate structure 40', shown in FIG. 3F.

In an example when an acrylic latex is used as the binder, a first solvent of the binding agent 18 and/or combined agent 21 may evaporate and allow a second solvent of the binding agent 18 and/or combined agent 21 to come into contact with and soften the acrylic latex particles. Then, as the second solvent evaporates, the softened acrylic latex particles may merge or coalesce to form the continuous network or film to bind the patterned volumes of build material particles 14 into, for example, a densified intermediate part 25' and a densified build material support structure 23' (which together make up the densified intermediate structure 40' shown in FIG. 3F).

The liquid components may be volatile enough to evaporate at ambient temperature, or the densification/evaporation temperature may be above ambient temperature. As used therein, "ambient temperature" may refer to room temperature (e.g., ranging about 18° C. to about 22° C.), or to the temperature of the environment in which the 3D printing method is performed (e.g., the temperature of the build area platform 16 during the forming and patterning of new layers). The temperature of the environment in which the 3D printing method is performed (e.g., the temperature of the build area platform 16 during the forming and patterning of new layers) is about 5° C. to about 50° C. below the boiling point of the agent 18 and 19 or 21. In an example, the temperature of the build area platform 16 during the forming and patterning of new layers ranges from about 50° C. to about 95° C. Other examples of the 3D printing environment temperature may range from about 40° C. to about 65° C. The densification/evaporation temperature may also be below a temperature at which the binder would be damaged (i.e., be unable to bind). For a majority of suitable binders, the upper limit of the densification/evaporation temperature ranges from about 180° C. to about 220° C. Above this temperature threshold, the binder would chemically degrade into volatile species and leave the patterned components 23, 25, and thus would stop performing their function. For some agents 18, and when used agent 19, the densification/evaporation temperature ranges from about 50° C. to about 220° C. As still another example, the densification/evaporation temperature may range from about 70° C. to about 90° C.

During evaporation, the gas precursor (in the build material support structure 23) can collect across the surfaces of the build material particles 14 in the build material support structure 23.

In some examples of the method 100, the binding agent 18, and when used, the combined agent 19, may be allowed to evaporate without additional heating. For example, more volatile solvents can evaporate in seconds at ambient temperature. In these examples, the build material cake is not exposed to heat or radiation to generate heat, and the water and/or solvent(s) in the binding agent 18, and when used, in the combined agent 19 evaporate(s) over time. In an example, the water and/or solvent(s) in the binding agent 18, and when used, the combined agent 19 may evaporate without heating within a time period ranging from about 1 second to about 1 minute.

In other examples of the method 100, the intermediate structure 40, 40A, 40B, 40C, 40D, 40E may be heated to an evaporation temperature at a rate of about 1° C./minute to about 10° C./minute, although it is contemplated that a slower or faster heating rate may be used. The heating rate may depend, in part, on one or more of: the agents 18, 19, 21 used, the size (i.e., thickness and/or area (across the x-y plane)) of the layers, and/or the characteristics of the structure 40, 40A, 40B, 40C, 40D (e.g., size, wall thickness, etc.). In an example, intermediate structure 40, 40A, 40B, 40C, 40D is heated to the densification/evaporation temperature at a rate of about 2.25° C./minute.

At least substantially evaporating (with or without heating) activates the binder, and the activated binder provides enough adhesive strength to hold the densified intermediate structure 40' together with enough mechanical stability to survive removal from the build material cake. As such, the densified intermediate structure 40' exhibits handleable mechanical durability, and is capable of being separated from the non-patterned build material 28. FIG. 3F depicts the densified intermediate structure 40' after the non-patterned build material 18 has been removed.

While not shown, it is to be understood that the intermediate structures 40A, 40B, 40C, 40D, 40E may be densified in a similar manner.

The densified intermediate structure 40' may be extracted from the build material cake or separated from the non-patterned build material 28 by any suitable means. In an example, the densified intermediate structure 40' may be extracted by lifting the densified intermediate structure 40' from the non-patterned build material 28. Any suitable extraction tool may be used. In some examples, the densified intermediate structure 40' may be cleaned to remove non-patterned build material 28 from its surface. In an example, the densified intermediate structure 40' may be cleaned with a brush and/or an air jet, may be exposed to mechanical shaking, or may be exposed to other techniques that can remove the non-patterned build material 28. As shown in FIG. 3F, removal of the non-patterned build material 28 can expose outer edges of the densified intermediate structure 40' and any spaces 50 between the densified build material support structure 23' and portions of the densified patterned intermediate part 25' that had been occupied by the non-patterned build material 28 during the printing process.

Figure 3G:
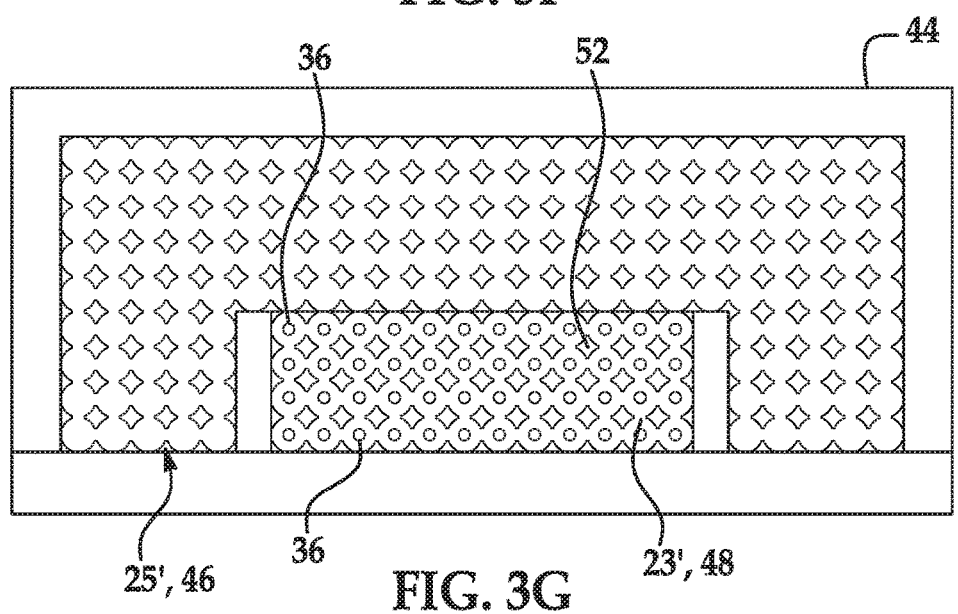
Figure 3H:
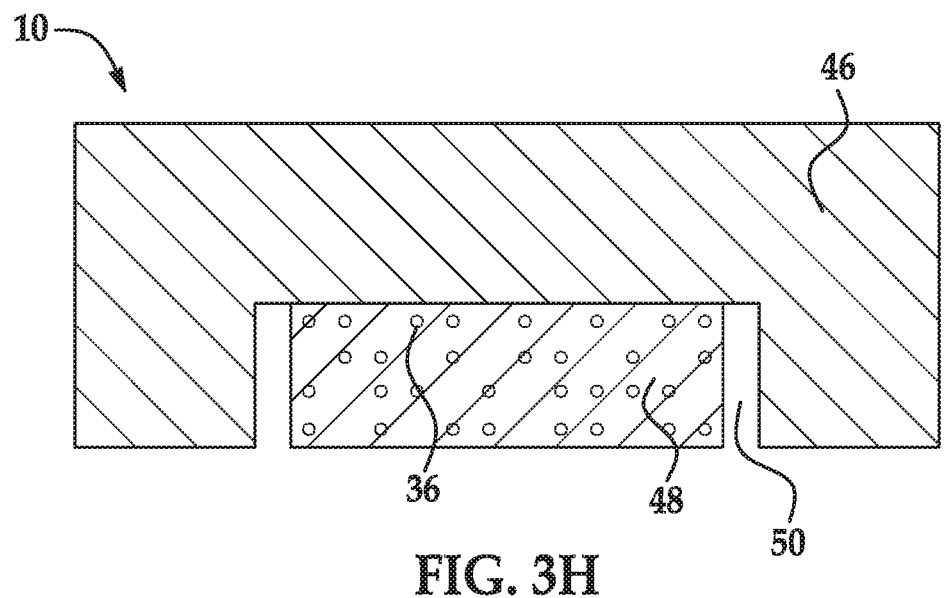

When the densified intermediate structure 40' is extracted from the build material cake and/or cleaned of the non-patterned build material 28, the densified intermediate structure 40' may be removed from the build area platform 16 and placed in a heating mechanism 44 (as shown in FIG. 3G).

If after excavation from the build area platform 16, the densified intermediate structure 40' still contains an undesirable amount of less-volatile solvent(s), the post-excavation baking may be performed at a temperature that will evaporate these solvent(s).

The heating mechanism 44 may be used to perform a heating sequence, which involves exposing the intermediate structure 40' (or the densified version of the intermediate structures 40A, 40B, 40C, 40D, or 40E) to a temperature that activates the gas precursor to create gas pockets 36 in the build material support structure 23. The heating sequence may form a 3D particle article 10, as shown in FIG. 3H. In some examples, heating involves exposure to a series of temperatures that form a 3D object 46 from the patterned intermediate part 25, 25' and an irreversibly breakable 3D support structure 48 from the build material support structure 23, 23', the irreversibly breakable 3D support structure 48 including the gas pockets 36.

The series of temperatures may involve heating the (densified) intermediate structure 40' (or the densified version of the intermediate structures 40A, 40B, 40C, 40D, 40E) to a de-binding temperature, and then to an initial sintering temperature, followed by a gas pocket formation temperature, followed by a final sintering temperature. Briefly, the de-binding temperature removes the binder from the densified intermediate structure 40' to produce an at least substantially binder-free intermediate structure, and the at least substantially binder-free intermediate structure may be sintered at the various temperatures to form the final 3D object 46 and the irreversibly breakable 3D support structure 48, and to create the gas pockets 36 within the irreversibly breakable 3D support structure 48. Heating to de-bind and heating to sinter and create the gas pockets 36 may take place at several different temperatures, where the temperature for de-binding is lower than the temperatures for sintering and gas pocket creation.

Heating to de-bind is accomplished at a thermal decomposition temperature that is sufficient to thermally decompose the binder. As such, the temperature for de-binding depends upon the binder in the agents 18, 19 used. In an example, the thermal decomposition temperature ranges from about 250° C. to about 600° C. In another example, the thermal decomposition temperature ranges from about 300° C. to about 550° C. The binder may have a clean thermal decomposition mechanism (e.g., leaves non-volatile residue in an amount <5 wt % of the initial binder, and in some instances non-volatile residue in an amount <1 wt % of the initial binder). The smaller residue percentage (e.g., close to 0%) is more desirable. During the de-binding stage, the binder decomposes first into a liquid phase of lower viscosity. Evaporation of this liquid may initially increase the open porosity in the substantially binder-free intermediate structure.

While not being bound to any theory, it is believed that the at least substantially binder-free intermediate structure may maintain its shape due, for example, to one or more of: i) the low amount of stress experienced by the at least substantially binder-free part due to it not being physically handled, and/or ii) low level necking occurring between the build material particles 14 at the thermal decomposition temperature of the binder. The at least substantially binder-free intermediate structure may maintain its shape although the binder is at least substantially removed and the build material particles 14 are not yet sintered.

The temperature may be raised to begin the initial stages of sintering of the substantially binder-free intermediate structure, which can result in the formation of weak bonds that are strengthened during final sintering. The initial sintering temperature is selected to further densify the substantially binder-free intermediate structure and to decrease or eliminate the open porosity throughout the substantially binder-free intermediate structure. Open pores are pores that are interconnected to other pores, and thus can undesirably allow gas(es) generated by the gas precursor to be vented out of the build material support structure 23 as it is sintered to form the irreversibly breakable 3D support structure 48. The initial sintering temperature may be above the de-binding temperature, may be capable of softening the build material particles 14, and may be below the activation temperature of the gas precursor, so that the open pores are transformed into closed pores (through the build material particles 14 beginning to sinter together) and so that gas(es) are not yet generated by the gas precursor. As such, the initial sintering temperature allows the build material particles 14 in the build material support structure 23 to soften and merge together enough to surround or enclose the gas precursor without generating pocket forming gases.

The initial sintering temperature may thus be dependent upon the build material used, as well as the gas precursor in the agent 19 or 21 used to pattern the build material support structure 23. Moreover, the initial sintering temperature may also be dependent on the sintering rate of build material. For example, metal powders with a smaller particle size can be sintered at a higher rate at lower temperatures than the same metal powders with a larger particle size. In this example, the previously described open to closed porosity transition in the build material support structure 23 created from smaller particle size metal powders may occur relatively rapidly at lower temperatures, which enables the use of a lower initial sintering temperature.

The heating temperature may then be raised to activate the gas precursor in order to create/form the gas pockets 36 in the irreversibly breakable 3D support structure 48. Sintering has been initiated to form the 3D object 46 and the irreversibly breakable 3D support structure 48, which means that the build material particles 14 of the build material support structure 23 have begun to coalesce and that open pores (i.e., pores that connect to other pores) have begun to transform to closed pores (i.e., pores completely surrounded by coalesced build material). As such, the gas precursor is either residing inside the bulk build material particles 14 or is trapped inside the closed pores, and thus is isolated from open porosity. Thus, the gas precursor may be activated, as the generated gas will be trapped within the irreversibly breakable 3D support structure 48.

The gas pocket formation temperature may be dependent upon the properties of build material. The gas pocket formation temperature may be below the final sintering temperature and the melting temperature of the build material. For example, when aluminum/aluminum alloy build materials (melting temperature may be as low as about 550° C.) are used, it may be desirable for the gas pocket activation or formation temperature to be within the range of from about 500° C. to about 590° C., and the gas precursor may be selected accordingly. As an example, titanium hydride may be a suitable gas precursor to be used with aluminum build material. For another example, when ferrous build material is used, it may be desirable for the gas pocket activation or formation temperature to be within the range from about 900° C. to about 1400° C., and the gas precursor may be selected accordingly.

The gas pocket formation temperature may also be dependent on the sintering rate of the build material. As previously described herein, metal powders with a smaller particle size can be sintered at a higher rate and at lower temperatures than the same metal powders with a larger particle size, and thus the open to closed porosity transition may occur relatively rapidly at lower temperatures. This would enable the use of gas precursors with lower activation temperatures. As one specific example, a stainless steel alloy build material having a particle size distribution of D10=8.92 μm, D50=14.8 μm, and D90=23.25 μm may have a gas pocket formation temperature ranging from about 1100° C. to about 1390° C. For smaller particle size distributions of the stainless steel alloy build material, the gas pocket formation temperature will shift to temperatures lower than 1100° C.

The following are some other examples of suitable gas precursors and their corresponding activation or gas pocket formation temperatures. Transition metal hydrides can generate substantial amounts of hydrogen gas at a temperature ranging from about 500° C. to about 900° C. Alkaline earth carbonates can generate carbon dioxide at a temperature ranging from about 840° C. to about 1500° C. Solid state mixtures of oxidizable species and oxidizing agents can generate carbon oxide gases, such as carbon dioxide or carbon monoxide, at temperatures ranging from about 800° C. to about 1400° C.

Heating to create the gas pockets 36 may take place in an environment/atmosphere that is compatible with the gas precursor and build material used to form the build material support structure 23. As one example, when the gas precursor in the agent 19 or 21 used to pattern the build material support structure 23 is titanium hydride or another transition metal hydride, a hydrogen gas ($H_2$) environment may be used during heating. As another example, when the gas precursor in the agent 19 or 21 used to pattern the build material support structure 23 is an alkaline earth carbonate, any gas environment (e.g., inert, reducing, vacuum, etc.) may be used during heating. As still another example, when the gas precursor in the agent 19 or 21 used to pattern the build material support structure 23 is the solid state mixture, a non-reducing environment (e.g., argon, nitrogen, or vacuum) may be used during heating.

FIG. 3G illustrates the intermediate structure 40' during heating to the gas pocket formation temperature. As depicted, the build material particles 14 have begun to coalesce in each of the densified patterned intermediate part 25' and the densified build material support structure 23'. As such, the formation of the 3D object/part 46 and the irreversibly breakable 3D support structure 48 has been initiated. The initial coalescence of the build material particles 14 has formed the closed pores 52 in each of the densified patterned intermediate part 25' and the densified build material support structure 23'. Within the densified build material support structure 23', the closed pores 52 entrap the gas precursor, which has generated the gas pockets 36 as a result of being exposed to the gas pocket formation temperature.

The temperature may be raised again to finish the stages of sintering. During final sintering, the build material particles 14 continue to coalesce to form the 3D object 46 and irreversibly breakable 3D support structure 48, and so that a desired density of at least the 3D object 46 is achieved. The final sintering temperature is a temperature that is sufficient to sinter the remaining build material particles 14. The sintering temperature is highly depending upon the composition of the build material particles. During final sintering, the at least substantially binder-free intermediate structure may be heated to a temperature ranging from about 80% to about 99.9% of the melting point(s) of the build material particles 14. In another example, the at least substantially binder-free intermediate structure may be heated to a temperature ranging from about 90% to about 95% of the melting point(s) of the build material particles 14. In still another example, the at least substantially binder-free intermediate structure may be heated to a temperature ranging from about 60% to about 90% of the melting point(s) of the build material particles 14. In still another example, the final sintering temperature may range from about 10° C. below the melting temperature of the build material particles 14 to about 50° C. below the melting temperature of the build material particles 14. In still another example, the final sintering temperature may range from about 100° C. below the melting temperature of the build material particles 14 to about 200° C. below the melting temperature of the build material particles 14. The final sintering temperature may also depend upon the particle size and time for sintering (i.e., high temperature exposure time). As an example, the sintering temperature may range from about 500° C. to about 1800° C. In another example, the sintering temperature is at least 900° C. An example of a final sintering temperature for bronze is about 850° C., an example of a final sintering temperature for stainless steel is about 1400° C., and an example of a final sintering temperature for aluminum or aluminum alloys may range from about 550° C. to about 620° C. While these temperatures are provided as final sintering temperature examples, it is to be understood that the final sintering temperature depends upon the build material particles that are utilized, and may be higher or lower than the provided examples. Heating at a suitable final sintering temperature sinters and fuses the build material particles 14 to form a completed 3D object 46 and a completed irreversibly breakable 3D support structure 48, each of which may be even further densified relative to the corresponding components of the at least substantially binder-free intermediate structure. For example, as a result of final sintering, the density may go from 50% density to over 90%, and in some cases very close to 100% of the theoretical density.

The length of time at which the heat (for each of de-binding, gas pocket generation, and sintering) is applied and the rate at which the structure is heated may be dependent, for example, on one or more of: characteristics of the heating mechanism 44, characteristics of the binder, characteristics of the build material particles (e.g., metal type, particle size, etc.), characteristics of the gas precursor, and/or the characteristics of the 3D object/part 46 (e.g., wall thickness).

The densified intermediate structure 40' (or the densified version of the intermediate structures 40A, 40B, 40C, 40D, or 40E) may be heated at the de-binding temperature for a time period ranging from about 10 minutes to about 72 hours. When the structure 40' contains open porosity to vent out binder pyrolysis, and/or the amount of the binder in the densified intermediate structure 40' is low (e.g., from about 0.01 wt % to about 4.0 wt % based on the total weight of the build material particles 14), and/or the wall thickness of the structure 40' is relatively thin, the time period for de-binding may be 3 hours (180 minutes) or less. Longer times may be used if the structure 40' has less open porosity, if the structure 40' has thicker walls, and/or if the structure 40' has a higher concentration of binder. In an example, the de-binding time period is about 60 minutes. In another example, the de-binding time period is about 180 minutes. The densified green part may be heated to the de-binding temperature at a rate ranging from about 0.5° C./minute to about 20° C./minute. The heating rate may depend, in part, on one or more of: the amount of the binder in the densified intermediate structure 40', the porosity of the densified intermediate structure 40', and/or the characteristics of the densified intermediate structure 40'.

The at least substantially binder-free intermediate structure may be heated at each of the initial sintering temperature, the gas formation temperature, and the final sintering temperature for respective time periods ranging from about 20 minutes to about 15 hours. In an example, each time period is 60 minutes. In another example, each time period is 90 minutes. In still another example, each of the initial sintering time period, the gas formation time period, and the final sintering time period is less than or equal to 3 hours. The at least substantially binder-free intermediate structure may be heated to each of the initial sintering temperature, the gas formation temperature, and the final sintering temperature at a rate ranging from about 1° C./minute to about 20° C./minute. In an example, the at least substantially binder-free intermediate structure is heated to each of the initial sintering temperature, the gas formation temperature, and the final sintering temperature at a rate ranging from about 10° C./minute to about 20° C./minute. In a specific example, the at least substantially binder-free intermediate structure is heated to the initial sintering temperature at a rate of about 10° C./minute and is held at the initial sintering temperature for about 60 minutes; and then is heated to the gas formation temperature at a rate of about 10° C./minute, is held at the gas formation temperature for about 60 minutes; and then is heated to the final sintering temperature at a rate of about 10° C./minute, is held at the final sintering temperature for about 60 minutes.

An example of the resulting 3D printed article 10 is shown in FIG. 3H. After heating, the 3D printed article 10 may be cooled. It is to be understood that the gas pockets 36 remain in the irreversibly breakable 3D support structure 48 when cooled.

The 3D printed article 10 includes a first object (e.g., the 3D object 46) and the irreversibly breakable 3D support structure 48 temporarily bound to the first object, wherein the irreversibly breakable 3D support structure 48 comprises the gas pockets 36. In an example, the first object is a metal 3D part and the irreversibly breakable 3D support structure is a metal 3D support structure including the gas pockets 36.

The gas pockets 36 are localized to the irreversibly breakable 3D support structure 48, and thus add fragility to the irreversibly breakable 3D support structure 48. As such, the irreversibly breakable 3D support structure 48 provides a weaker structure than the first object (e.g., the 3D object 46). As such, the irreversibly breakable 3D support structure 48 can be easily removed from the first object (e.g., the 3D object 46) by breaking the irreversibly breakable 3D support structure 48. Breaking may be accomplished using sand blasting, bead blasting, air jetting, tumble finishing (i.e., barrel finishing), or vibratory finishing. Tumble or vibratory finishing techniques may be performed wet (involving liquid lubricants, cleaners, or abrasives) or dry.

Figure 3I:
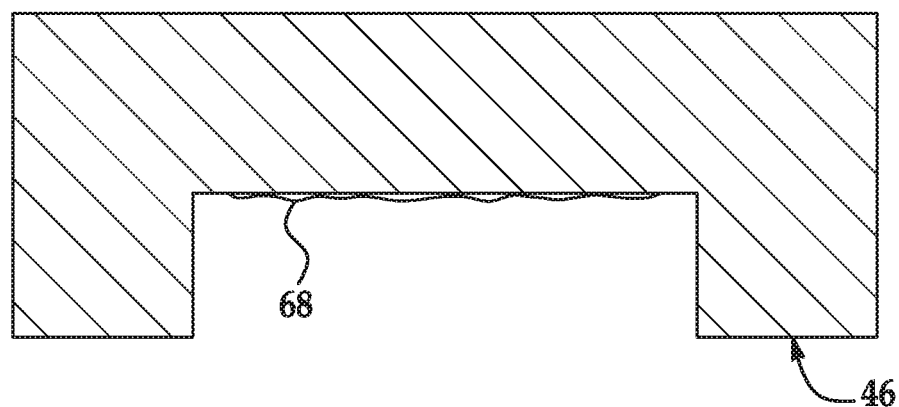

An example of the 3D object 46, after the irreversibly breakable 3D support structure 48 has been broken and removed therefrom, is depicted in FIG. 3I. The structural weakness of the irreversibly breakable 3D support structure 48 enables the structure 48 to be broken apart and thus removed from the 3D object 46. At most, some remnants 68 of metal pieces from the irreversibly breakable 3D support structure 48 may remain attached to the 3D object 46. It is to be understood that once the irreversibly breakable 3D support structure 48 is broken, the gas within the gas pockets 36 may be released.

Printing System

Referring now to FIG. 4, an example of the 3D printing system 60 that may be used to perform examples of the method 100 disclosed herein is depicted. It is to be understood that the 3D printing system 10 may include additional components (some of which are described herein) and that some of the components described herein may be removed and/or modified. Furthermore, components of the 3D printing system 60 depicted in FIG. 4 may not be drawn to scale and thus, the 3D printing system 60 may have a different size and/or configuration other than as shown therein.

In an example, the three-dimensional (3D) printing system 60, comprises: a supply 11 of build material particles 14; a build material distributor 13; a supply of a binding agent 18 and a supply of a separate gas generating liquid functional agent 21, or a supply of a combined agent 19; applicator(s) 17 for selectively dispensing the binding agent 18 and the separate gas generating liquid functional agent 21 or the combined agent 19; a controller 62; and a non-transitory computer readable medium having stored thereon computer executable instructions to cause the controller 62 to cause the printing system to perform some or all of the method disclosed herein.

As mentioned above, the build area platform 16 receives the build material particles 14 from the build material supply 11. The build area platform 16 may be integrated with the printing system 60 or may be a component that is separately insertable into the printing system 60. For example, the build area platform 16 may be a module that is available separately from the printing system 60. The build area platform 16 that is shown is one example, and could be replaced with another support member, such as a platen, a fabrication/print bed, a glass plate, or another build surface.

While not shown, it is to be understood that the build area platform 16 may also include built-in heater(s) for achieving and maintaining the temperature of the environment in which the 3D printing method is performed.

Also as mentioned above, the build material supply 11 may be a container, bed, or other surface that is to position the build material particles 14 between the build material distributor 13 and the build area platform 16. In some examples, the build material supply 11 may include a surface upon which the build material particles 14 may be supplied, for instance, from a build material source (not shown) located above the build material supply 11. Examples of the build material source may include a hopper, an auger conveyer, or the like. Additionally, or alternatively, the build material supply 11 may include a mechanism (e.g., a delivery piston) to provide, e.g., move, the build material particles 14 from a storage location to a position to be spread onto the build area platform 16 or onto a previously patterned layer.

As shown in FIG. 4, the printing system 60 also the build material distributor 18 and the applicator(s) 17, both of which have been described in reference to the method 100.

Each of the previously described physical elements may be operatively connected to the controller 62 of the printing system 60. The controller 62 may process print data that is based on a 3D object model of the 3D object/part 46 and of the irreversibly breakable 3D support structure 48 to be generated. In response to data processing, the controller 62 may control the operations of the build area platform 16, the build material supply 11, the build material distributor 13, and the applicator(s) 17. As an example, the controller 62 may control actuators (not shown) to control various operations of the 3D printing system 62 components. The controller 60 may be a computing device, a semiconductor-based microprocessor, a central processing unit (CPU), an application specific integrated circuit (ASIC), and/or another hardware device. Although not shown, the controller 62 may be connected to the 3D printing system 60 components via communication lines.

The controller 62 manipulates and transforms data, which may be represented as physical (electronic) quantities within the printer's registers and memories, in order to control the physical elements to create the printed article 10. As such, the controller 62 is depicted as being in communication with a data store 64. The data store 64 may include data pertaining to a 3D object 46 and an irreversibly breakable 3D support structure 48 to be printed by the 3D printing system 60. The data for the selectively delivery of the build material 16, the binding agent 18, the gas generating liquid functional agent 19 or 21, etc. may be derived from a model of the components 46, 48 to be formed. For instance, the data may include the locations on each build material layer 12, etc. that the applicator 17 is to deposit the binding agent 18. In one example, the controller 62 may use the data to control the applicator 17 to selectively apply the binding agent 18. The data store 64 may also include machine readable instructions (stored on a non-transitory computer readable medium) that are to cause the controller 62 to control the amount of build material particles 14 that is supplied by the build material supply 11, the movement of the build area platform 16, the movement of the build material distributor 13, the movement of the applicator 17, etc.

As shown in FIG. 4, the printing system 60 also includes the heating mechanism 44. Examples of the heating mechanism 44 include a conventional furnace or oven, a microwave, or devices capable of hybrid heating (i.e., conventional heating and microwave heating). As shown in FIG. 4, the heating mechanism 44 may be a module that is available separately from the printing system 60. In other examples, the heating mechanism 44 may be integrated with the printing system 60.

The heating mechanism 44 and/or the heater(s) in the build area platform 16 may be operatively connected to a driver, an input/output temperature controller, and temperature sensors, which are collectively shown as heating system components 66. The heating system components 66 may operate together to control the heating mechanism 44 and/or the heater(s) in the build area platform 16. The temperature recipe (e.g., heating exposure rates and times) may be submitted to the input/output temperature controller. During heating, the temperature sensors may sense the temperature of the build material particles 14 on the platform 16 or in the intermediate structure 40, 40', and the temperature measurements may be transmitted to the input/output temperature controller. For example, a thermometer associated with the heated area can provide temperature feedback. The input/output temperature controller may adjust the heating mechanism 44 and/or the heater(s) in the build area platform 16 power set points based on any difference between the recipe and the real-time measurements. These power set points are sent to the drivers, which transmit appropriate voltages to the heating mechanism 44 and/or the heater(s) in the build area platform 16. This is one example of the heating system components 66, and it is to be understood that other heat control systems may be used. For example, the controller 62 may be configured to control the heating mechanism 44 and/or the heater(s) in the build area platform 16.

It is to be understood that the ranges provided herein include the stated range and any value or sub-range within the stated range. For example, from about 500° C. to about 3500° C. should be interpreted to include not only the explicitly recited limits of from about 500° C. to about 3500° C., but also to include individual values, such as about 690° C., 1000.5° C., 2055° C., 2750° C., etc., and sub-ranges, such as from about 900° C. to about 3250° C., from about 525° C. to about 2500° C., from about 1020° C. to about 2020° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
    patterning build material layers to form an intermediate structure, the patterning including:
        selectively applying a binding agent to define a patterned intermediate part; and
        selectively applying the binding agent and a separate agent to define a build material support structure adjacent to at least a portion of the patterned intermediate part, the separate agent consisting of a gas precursor, any of a surfactant or a dispersing aid, a co-solvent, an optional antimicrobial agent, an optional anti-kogation agent, and a balance of water; and
    heating the intermediate structure to a temperature that activates the gas precursor to create gas pockets in the build material support structure.

2. The method as defined in claim 1 wherein the heating involves exposure to a series of temperatures that form:
    a 3D object from the patterned intermediate part; and
    an irreversibly breakable 3D support structure from the build material support structure, the irreversibly breakable 3D support structure including the gas pockets.

3. The method as defined in claim 2 wherein the heating involves:
    heating the intermediate structure to a de-binding temperature; and
    then heating the intermediate structure to an initial sintering temperature, followed by a gas pocket formation temperature, followed by a final sintering temperature.

4. The method as defined in claim 2, further comprising removing the irreversibly breakable 3D support structure from the 3D object using sand blasting, bead blasting, air jetting, tumble, or vibratory finishing.

5. The method as defined in claim 1 wherein the patterned intermediate part at least partially overlies the build material support structure.

6. The method as defined in claim 1 wherein patterning the build material layers includes:
- selectively applying the binding agent and the separate agent on a portion of an initial build material layer, thereby forming a layer of the build material support structure;
- selectively applying the binding agent on an other portion of the initial build material layer to define a layer of the patterned intermediate part, wherein the layer of the build material support structure and the layer of the patterned intermediate part are separated by non-patterned build material; and
- forming a remaining portion of the patterned intermediate part on the build material support structure, thereby forming the intermediate structure including the patterned intermediate part and the build material support structure temporarily bound together.

7. The method as defined in claim 6 wherein:
- the build material support structure is a multi-layer structure;
- prior to forming the remaining portion of the patterned intermediate part, the method further comprises:
  - iteratively applying additional build material layers;
  - selectively applying the the binding agent and the separate agent to some of the additional build material layers to define several layers of the build material support structure; and
  - selectively applying the binding agent to some other of the additional build material layers to define several layers of a region of the patterned intermediate part, wherein the several layers of the build material support structure and the several layers of the region of the patterned intermediate part are separated by additional non-patterned build material; and
- the forming of the remaining portion of the patterned intermediate part includes:
  - applying a further layer of build material on the build material support structure and on an outer layer of the region of the patterned intermediate part; and
  - selectively applying the binding agent to the further layer to define a patterned layer of the remaining portion of the patterned intermediate part.

8. The method as defined in claim 1 wherein patterning the build material layers includes:
- iteratively applying individual build material layers;
- selectively applying the binding agent to at least some of the individual build material layers to define several layers of the patterned intermediate part; and
- selectively applying the binding agent and the separate agent to at least some of the individual build material layers to define several layers of the build material support structure.

9. The method as defined in claim 1 wherein the build material support structure is a single layer structure, and wherein the patterned intermediate part at least partially overlies the single layer structure.

10. The method as defined in claim 1 wherein the gas precursor is selected from the group consisting of a transition metal hydride, an alkaline earth carbonate that releases carbon dioxide when activated, and a solid state mixture of an oxidizable species and an oxidizing agent to produce an oxidation product in a gas state at a sintering temperature used during the heating.

11. The method as defined in claim 10 wherein one of:
- the gas precursor is the transition metal hydride, and the method further comprises exposing the intermediate structure to hydrogen gas during the heating; or
- the gas precursor is the solid state mixture, and the method further comprises exposing the intermediate structure to an inert gas or a vacuum environment during the heating.

\* \* \* \* \*